United States Patent
Gard

(10) Patent No.: US 8,067,321 B2
(45) Date of Patent: Nov. 29, 2011

(54) SODIUM-POTASSIUM HEXAMETAPHOSPHATE AND POTASSIUM METAPHOSPHATE WITH A LOW INSOLUBLES CONTENT

(75) Inventor: David Richard Gard, Kirkwood, MO (US)

(73) Assignee: ICL Performance Products, LP, St. Louis, MO (US)

( * ) Notice: Subject to any disclaimer, the term of this patent is extended or adjusted under 35 U.S.C. 154(b) by 601 days.

(21) Appl. No.: 12/124,641

(22) Filed: May 21, 2008

(65) Prior Publication Data

US 2009/0291821 A1  Nov. 26, 2009

(51) Int. Cl.
   C03C 3/19 (2006.01)
   C03C 3/16 (2006.01)
   C03C 3/14 (2006.01)

(52) U.S. Cl. .............. 501/47; 501/45; 501/49

(58) Field of Classification Search ......... 501/41, 501/45, 47, 49; 71/64.11, 904
   See application file for complete search history.

(56) References Cited

U.S. PATENT DOCUMENTS

| | | | |
|---|---|---|---|
| 2,426,394 A | 8/1947 | Hall et al. | |
| 2,557,109 A | 6/1951 | Iler et al. | |
| 4,123,248 A * | 10/1978 | Drake | 504/101 |
| 4,332,823 A | 6/1982 | Buemi | |
| 4,340,525 A | 7/1982 | Hubner et al. | |
| 4,455,384 A * | 6/1984 | Day et al. | 501/15 |
| 4,737,375 A | 4/1988 | Nakel et al. | |
| 4,765,918 A | 8/1988 | Love et al. | |
| 4,917,913 A | 4/1990 | Buckholz, Jr. et al. | |
| 5,431,940 A | 7/1995 | Calderas et al. | |
| 5,641,532 A | 6/1997 | Pflaumer et al. | |
| 6,440,482 B1 | 8/2002 | Henson et al. | |
| 6,509,050 B1 | 1/2003 | Henson et al. | |
| 6,610,340 B1 | 8/2003 | Henson et al. | |
| 6,743,743 B2 * | 6/2004 | Sato | 501/47 |
| 2009/0239731 A1 * | 9/2009 | Hahn et al. | 501/42 |

FOREIGN PATENT DOCUMENTS

| | | |
|---|---|---|
| CH | 597764 | 4/1978 |
| EP | 1486477 | 12/2004 |
| GB | 1021058 | 2/1966 |
| GB | 2407097 | 4/2005 |
| JP | 04170339 | 6/1992 |
| WO | 99/62834 | 12/1999 |
| WO | 2001000527 A1 | 1/2001 |
| WO | 2005037975 | 4/2005 |
| WO | 2009154912 A2 | 12/2009 |

OTHER PUBLICATIONS

"4. Chemical Properties", downloaded from http://www.oharacorp.com/o4.html on Mar. 7, 2011, 2 pages.

(Continued)

Primary Examiner — Jerry A Lorengo
Assistant Examiner — Noah Wiese
(74) Attorney, Agent, or Firm — Thompson Coburn LLP

(57) ABSTRACT

Potassium-containing polyphosphate glasses having a relatively high amount of potassium and a relatively low level of insoluble material (e.g., less than about 10% by weight), and a method for their production that includes using a boron-containing glass-former additive. More specifically, these polyphosphate glasses may be described according to the formula $M_{(n+2)}O(PO_3)_n$, where M is at least K or K+Na and the glasses have a mole % M-as-K that is about 33 to 100. These polyphosphate glasses may be used in reduced sodium foods (e.g., beverages and meat products).

34 Claims, 6 Drawing Sheets

OTHER PUBLICATIONS

"Optical Glass Information", downloaded from http://www.oharacorp.com/catalog.html on Mar. 7, 2011, 1 page.

Bergman et al., "Reaction of Metaphosphates and Metaborates During Crystallization", Russian Journal of Inorganic Chemistry, 1969, pp. 1668-1669, vol. 14, No. 11.

Bergman et al., "Ternary Systems of Potassium Sulphates, Metaphosphates, Orthophosphates, Tetraborates, and Pyrophosphates [the K2B4O7-KPO3-K2SO4 and K4P2O7-K3PO4-K2SO4 Ternary Systems]", Russian Journal of Inorganic Chemistry, 1970, pp. 873-874, vol. 15, No. 6.

Bergman et al., "The K II BO2, PO3, SO4 System", Russian Journal of Inorganic Chemistry, 1969, pp. 710-711, vol. 14, No. 5.

Bergman et al., "The K, Na II B4O7, PO3 Reciprocal System", Russian Journal of Inorganic Chemistry, 1969, pp. 1036-1038, vol. 14, No. 7.

Bergman et al., "The System of Sodium and Potassium Metaphosphates and Metaborates", Russian Journal of Inorganic Chemistry, 1969, pp. 1514-1516, vol. 14, No. 10.

Bhargava et al., "Intrinsic Viscosity-Molecular Weight Relationships in Copolyphosphates", Polymer Journal, 1986, pp. 619-624, vol. 18. No. 8, Tokyo, Japan.

Griffith, "Structure and Properties of the Condensed Phosphates. XIII. Refractometry", Journal of the American Chemical Society, Feb. 12, 1957, pp. 509-513, vol. 79.

International Preliminary Report on Patentability (Chapter II) for PCT/US2009/044134 issued Sep. 14, 2010.

International Search Report and Written Opinion for PCT/US2009/044134 dated Dec. 11, 2009.

Mehrotra et al., "IR, NMR, and Magnetochemical Studies on Complex Polymetaphosphates", Indian Journal of Chemistry, 1972, pp. 726-730, vol. 10, No. 7.

Mehrotra, "Synthesis and Properties of Simple and Complex Polymetaphosphate Glasses of Alkali Metals", Pure and Applied Chemistry, 1975, pp. 201-219, vol. 44, No. 2.

Morey et al., "The System NaPO3-Na4P2O7-K4P2O7-KPO3", Journal of the American Chemical Society, 1955, pp. 5003-5011, vol. 77.

Morey, "The Binary Systems: NaPO3-KPO3 and K4P2O7-KPO3", Journal of the American Chemical Society, 1954, pp. 4724-4726, vol. 76.

Ray et al., "Oxide Glasses of Very Low Softening Points—4. Preparation and Properties of Ultraphosphate Glasses Containing Boric Oxide", Glass Technology, Apr. 1976, pp. 66-71, vol. 17, No. 2.

Suzuya et al., "Structure of Vitreous P2O5 and Alkali Phosphate Glasses", Journal of Non-Crystalline Solids, 1998, pp. 650-657, vol. 232-234.

Vyatchina et al., "Glass Formation and Vibrational Spectra of Glasses in the SrSO4-KPO3-Na2B4o7 System", Glass Physics and Chemistry, 2003, pp. 522-525, vol. 29, No. 6, Ural Division, Institute of Solid-State Chemistry, Russian Academy of Sciences, Yekaterinburg, Russia.

Westman et al. "Constitution of Sodium, Potassium, and Lithium Phosphate Glasses", Journal of the American Ceramic Society, Sep. 1957, pp. 293-299, vol. 40, No. 9.

* cited by examiner

SODIUM-POTASSIUM
HEXAMETAPHOSPHATE AND POTASSIUM
METAPHOSPHATE WITH A LOW
INSOLUBLES CONTENT

BACKGROUND OF THE INVENTION

The invention relates to potassium-containing polyphosphate glass compositions with low levels of water-insoluble compounds and to methods for their preparation. The invention particularly is directed to polyphosphates having a ratio of potassium to sodium that is relatively high and a relatively low amount of water-insoluble impurities and methods for their preparation.

Sodium salts of phosphoric acid derivatives, especially food grade sodium hexametaphosphate (SHMP), can be used to reduce and control various classes of microorganisms, specifically those important to the safety and spoilage of food and beverages during processing, storage, and distribution. Because these compositions control pathogens at near neutral pH conditions using very dilute preparations, the physicochemical changes (flavor, texture, color, nutrient retention) that may occur at highly alkaline or highly acidic conditions are reduced. For example, sodium salts of phosphoric acid derivatives have been used with preservatives to enhance the potency of preservatives so that lower levels of preservatives can be used, thus improving taste (see, e.g., Calderas (U.S. Pat. No. 5,431,940) and Pflaumer (U.S. Pat. No. 5,641,532), which disclose the use of sodium-containing polyphosphates in combination with sorbate preservatives in dilute juice beverages having relatively low water hardness).

Notwithstanding the antimicrobial benefits, the addition of such sodium salts to foods and beverages increases their sodium content and makes them unacceptable to users who require a low sodium intake. Potassium metaphosphate (KMP), $[KPO_3]_n$, (which is also know as Potassium Kurrol's salt) is a crystalline polyphosphate that contains potassium instead of sodium as the metal cation. Because potassium polyphosphate salts, including KMP, contain negligible levels of sodium, their use would substantially reduce the amount of added sodium to foods. But such compositions have not been widely utilized in food applications because they are difficult to dissolve in water and contain relatively large amounts of insoluble material. Technically, KMP is water-soluble but it dissolves so slowly that for practical purposes is considered water-insoluble. Furthermore, it is extremely difficult to produce KMP as a glass or as an easily-solubilized material.

For these reasons, sodium-potassium hexametaphosphate (SKMP), which is a water-soluble mixed-cation analog of sodium hexametaphosphate having significant substitution of sodium with potassium, has the potential to be a desirable alternative to both SHMP and KMP in applications involving polyphosphates (e.g., applications where the functionality of a soluble, longer-chain polyphosphate is desired but without introducing high levels of sodium). Henson et al. (U.S. Pat. Nos. 6,509,050; 6,440,482; and 6,610,340) disclose the use of SKMP in food products as an alternative to SHMP. SKMP typically comprises a distribution of polyphosphate chain lengths and may be represented by the formula $(K, Na)_{(n+2)}O(PO_3)_n$, where n designates the average chain length of phosphates. The foregoing formula ignores minor components, including glass-former additives, residual water, water-insoluble impurities (e.g., $KPO_3$), possible ring phosphates, and other trace impurities.

Solid SKMP is a water-soluble glass (or amorphous or vitreous material) that is typically made by chilling a melt containing sodium and potassium phosphates having a mole ratio of cation to phosphorus (M/P mole ratio, where M=alkali metals, typically Na and K but it is possible other alkali metals may be included, and P=phosphorus) that is typically between about 0.9 and about 1.6. SKMP glass made by chilling a melt normally contains an amount of water-insoluble impurity that is typically primarily, if not entirely, KMP. Moreover, the propensity for insolubles to form in glassy SKMP increases with increasing substitution of sodium by potassium. For example, Henson et al. (WO 2001000527) discloses that the formation of insolubles increases substantially as the amount of potassium relative to the total amount of cations increases above about 70-80 mole % M-as-K (mole % M-as-K=100*moles of K/moles of M) and may depend on the chill rate. Iler (U.S. Pat. No. 2,557,109) describe preparation of aqueous solutions of mixed polyphosphates by ion exchange. Although aqueous solutions of mixed polyphosphates may be made by ion exchange, it may be preferred or desirable to make soluble potassium polyphosphates in solid form using a melt process. It still is desirable to further minimize the amount of sodium present in glassy SKMP.

Given the state of the field, a need exists for a water-soluble polyphosphate glass with a relatively high mole ratio of K to Na that also contains a relatively low level of insoluble material. Such a polyphosphate glass would be particularly useful as an antimicrobial agent in food and beverage applications. Furthermore, a need exists for a method of producing such a composition, in particular for decreasing the amount of insoluble content when a relatively high degree of potassium for sodium is used. Further, it is desirable that any method for decreasing the amount of insoluble content be compatible with the conditions currently used for preparing polyphosphates. Additionally, it is preferable for any additive to be a minor component of the resulting composition.

SUMMARY OF THE INVENTION

One embodiment of the invention is directed to a method for reducing the amount of water insoluble material in a potassium-containing polyphosphate glass composition. The method comprising including a boron-containing glass-forming additive as a raw material used to form a melt that is cooled to form said potassium-containing polyphosphate glass composition, wherein said boron-containing glass-forming additive is at a concentration effective for reducing the amount of water insoluble material formed in the melt-chilled potassium-containing polyphosphate glass composition.

Further, the invention is directed to a borate-modified potassium-containing polyphosphate glass composition represented as comprising $M_2O$, $B_2O_3$, and $P_2O_5$, wherein M is at least K. The polyphosphate glass composition has a mole % M-as-K that is at least about 33%, a concentration of $B_2O_3$ that is at least about 0.05% and no greater than about 5.00% by weight, and a M/P mole ratio that is at least about 0.90 and no greater than about 1.60.

In another embodiment, the invention is directed to a sodium-potassium polyphosphate (SKMP) composition, wherein the SKMP composition is represented as comprising $M_2O$, $B_2O_3$, and $P_2O_5$, wherein M is at least K and Na. The SKMP composition has:
  a) a concentration of $B_2O_3$ that is at least about 0.05% and no greater than about 5.00% by weight,
  b) a M/P mole ratio that is at least about 0.90 and no greater than about 1.60;

c) a mole % M-as-K that is at least about 33% and no greater than about 90%; and d) a concentration of water insolubles that is less than about 10% by weight.

Still further, the invention directed to a method for forming an aqueous sodium-potassium polyphosphate (SKMP) solution that is substantially free of water insolubles. The method comprising dissolving a SKMP composition in water, wherein the SKMP composition is represented as comprising $M_2O$, $B_2O_3$, and $P_2O_5$, wherein M is at least K and Na, and wherein the SKMP composition has:

a) a concentration of $B_2O_3$ that is at least about 0.05% and no greater than about 5.00% by weight, b) a M/P ratio that is at least about 0.90 and no greater than about 1.60; and c) a mole % M-as-K that is at least about 33% and no greater than about 90%.

In yet another embodiment, the invention is directed to a food composition comprising a sodium-potassium polyphosphate (SKMP) composition, wherein the SKMP composition is represented as comprising $M_2O$, $B_2O_3$, and $P_2O_5$, wherein M is at least K and Na, and wherein the SKMP composition has:

a) a concentration of $B_2O_3$ that is at least about 0.05% and no greater than about 5.00% by weight, b) a M/P mole ratio that is at least about 0.90 and no greater than about 1.60;

c) a mole % M-as-K that is at least about 33% and no greater than about 90%; and d) a concentration of water insolubles that is less than about 10% by weight.

Still further, the present invention is directed to a cleaning composition comprising water and a sodium-potassium polyphosphate (SKMP) composition, wherein the SKMP composition is represented as comprising $M_2O$, $B_2O_3$, and $P_2O_5$, wherein M is at least K and Na, and wherein the SKMP composition has:

a) a concentration of $B_2O_3$ that is at least about 0.05% and no greater than about 5.00% by weight, b) a M/P mole ratio that is at least about 0.90 and no greater than about 1.60;

c) a mole % M-as-K that is at least about 33% and no greater than about 90%; and d) a concentration of water insolubles that is less than about 10% by weight

BRIEF DESCRIPTION OF THE DRAWINGS

As shown in FIG. 5 the average chain length of phosphates decreases over various increasing M/P mole ratios from 0.95 to 1.05 in SKMP glass with a 76 mole % M-as-K and 0.5% by weight sodium tetraborate (which is equivalent to 0.35% by weight $B_2O_3$).

DETAILED DESCRIPTION OF THE INVENTION

Figure 1:
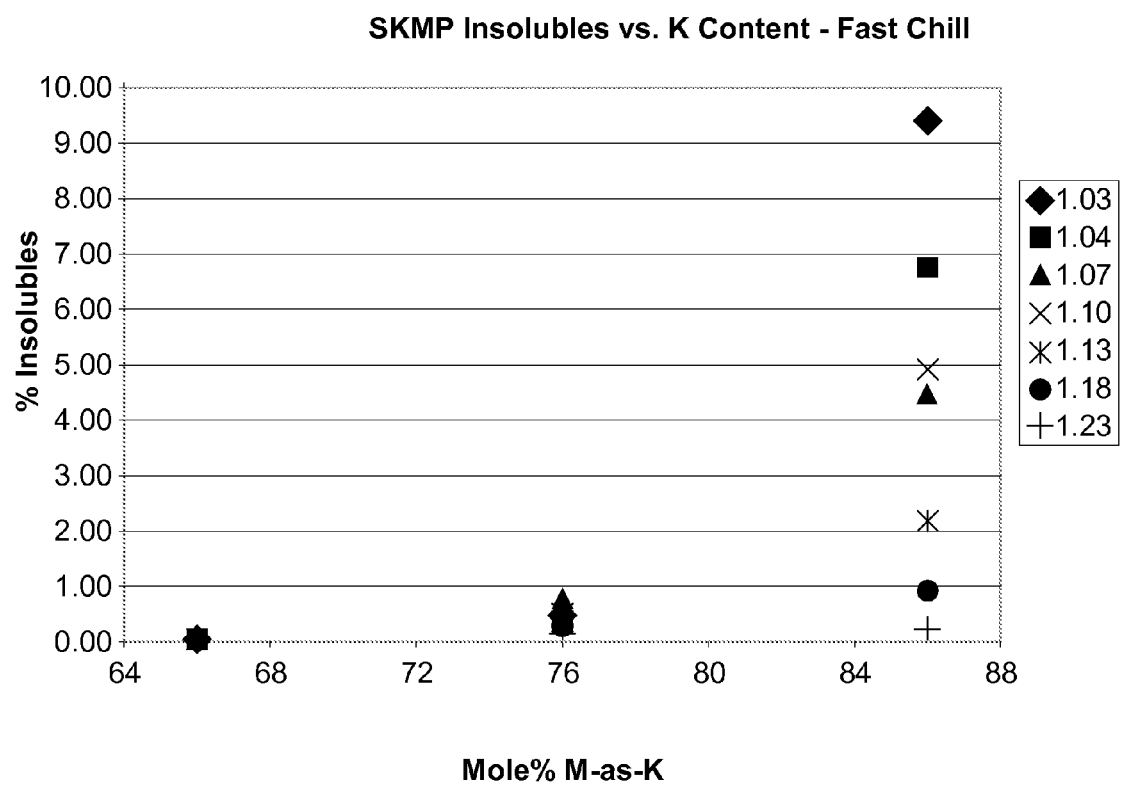
FIG. 1 illustrates the percent of insolubles in SKMP glass over a range of 66 to 86 mole % M-as-K when prepared with rapid cooling of the melt. Insolubles as a percentage of the SKMP glass increases with increasing K content as measured in mole % M-as-K for M/P mole ratios ranging from 1.03 to 1.23.

It has been discovered that the addition of a relatively minor quantity of a boron-containing glass-former additive to a melt having a relatively high K to Na mole ratio, upon cooling the melt, can result in a potassium-containing polyphosphate glass composition that has less water-insoluble compounds than if the additive were not included in the melt. The terms "insolubles", "water-insolubles", "insoluble compound(s)", and "water-insoluble compound(s)" mean the residual undissolved solids left behind after dissolving 10 grams of the potassium-containing polyphosphate glass composition (generally referred to as SKMP or KMP) in 100 milliliters of water at room temperature. As described above, the formation of insolubles increases substantially in prior art SKMP as the amount of potassium relative to the total amount of cations increases above about 70-80 mole % M-as-K depending on chill rate and prior art KMP is essentially crystalline and insoluble. But the present invention may be used to produce relatively high-potassium SKMP with substantially decreased insolubles and even glassy KMP with low levels of insolubles.

In view of the foregoing and as will be described below, the aforementioned addition of boron to potassium-containing polyphosphate compositions results in polyphosphates having one or more desirable properties. For example, the invention may be exploited to allow for increased K for Na substitution while decreasing the amount of water-insoluble content had the boron-containing additive not been included. Additionally, the method of the invention is advantageous in that it is compatible with typical method for preparing polyphosphates, with little or no equipment changes being required. Thus, the invention is useful for, among other things, producing a water-soluble, potassium-containing polyphosphate glass composition in which a reduction in Na content and a low quantity of water-insoluble impurities are desired. These polyphosphates are believed to be particularly useful in food applications because, in addition to the advantages provided by the reduction in sodium and insolubles content, the addition of boron is not believed to be harmful to humans or animals at low levels.

Making Polyphosphates

The methods of making alkali metal polyphosphates, generally, and compositions comprising glassy alkali metal polyphosphates, in particular, are known to those of ordinary skill in the art. In general, the methods involving forming a melt (i.e., a molten mixture of starting ingredients less the driven off components thereof such a volatiles, water, water of hydration, etc.) comprising the desired amount of the various constituents and then cooling the melt at a relatively fast rate such that the melt becomes a solid that, depending on the particular composition and process parameters is primarily amorphous. The melt and chill method has been used for making sodium polyphosphate glass but because potassium polyphosphates are almost always crystalline, the melt and chill process has not been used for making potassium polyphosphates. Advantageously, however, the addition of boron-containing compounds according to the methods of the invention allows for using the melt and chill method polyphosphate glasses with high amounts of potassium. In certain embodiments of the invention, the formulation and process parameters are selected so that the resulting potassium-containing polyphosphate composition contains little, if any, crystalline material or stated another way is primarily, if not entirely, glassy, amorphous, or vitreous.

One particular aspect of the present invention is formation of the sodium-potassium hexametaphosphate (SKMP) and this is typically made by chilling a melt comprising sodium and potassium phosphates from one or more sources. This reaction of forming such a melt may be represented by the following reaction:

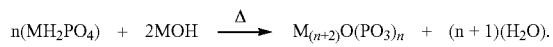

$$n(MH_2PO_4) + 2MOH \xrightarrow{\Delta} M_{(n+2)}O(PO_3)_n + (n+1)(H_2O).$$

To make potassium metaphosphate (KMP), the process is largely the same except that the materials or compounds including significant amounts of sodium (e.g., sodium above what is considered to be trace or impurity levels) are not included in the melt.

It is to be noted that phosphate melts and the solids cooled therefrom are typically described in terms of an $M_2O/P_2O_5$ mole ratio (or simply the M/P ratio) but, as noted above, the structure is believed to be based on repeating $(PO_3)^-$ groups. The inclusion of the boron-containing glass former additive in the melt and the resulting solid is believed to result in $(BO2)^-$ groups being substituted directly for $(PO_3)^-$ groups.

As mentioned above, polyphosphate glasses containing relatively high percentages of potassium prepared in accordance with typical methods contain what is considered to be a significant portion of water-insoluble materials, which are believed to be primarily crystalline potassium metaphosphate (KMP). It has been discovered that the level, concentration, or amount of such water-insolubles depends, in large part, upon the following four factors: (1) the % M-as-K; (2) the rate at which the molten glass is cooled to a solid; (3) the M/P ratio; and (4) the level, amount, or concentration of boron or borate in the melt/glass.

Regarding the first factor, it has been discovered that the level of water-insolubles generally become significant (e.g., greater than an amount ranging from about 0.1% to about 0.5%) as the replacement of Na by K exceeds an amount that ranges from about 60 to about 70 mole % M-as-K.

Regarding the cooling rate, it has been discovered that a significant reduction in insolubles may be realized by increasing the cooling rate. For example, it was observed that increasing the cooling rate decreased the insolubles of an SKMP (1.07 M/P and 76% M-as-K) from about 8% to about 0.6%.

Regarding the M/P ratio, it has been discovered that, in general, the level of insolubles tends to increase as the M/P mole ratio is decreased toward 1.00 but ratios below 1.00 have comparatively few insolubles. Additionally, at ratios less than 1.00, some crosslinking of the polyphosphate changes is believed to occur. It has also been discovered that as the M/P ratio increases the pH of the glass tends to increase, the amount of water in the glass tends to decrease, and the average chain length (n) tends to decrease. For example, a glass having a 1.03 M/P ratio may have an average chain length of between about 20 and about 30 but a similar glass with a 1.23 M/P ratio may have an average chain length of about 7 to about 8. In view of the foregoing, the polyphosphate glass compositions of the present invention are preferably formulated so that the M/P ratio is at least about 0.9 and no greater than about 1.6. And the ratio may be adjusted within the foregoing range depending upon the desired average chain length of the polyphosphate.

Regarding the addition of boron or borate, it has been discovered that a small concentration of borate ($B_2O_3$) (e.g., as little as about 0.05% by weight in the glass) tends to significantly reduce the amount of water-insolubles in such glassy phosphates. Stated another way, the inclusion of borate in a phosphate melt can be used to create what for practical purposes is an SKMP or KMP with significantly reduced amounts of insolubles. For example, experimental results to date have shown that the addition of borate to such melts have resulted in an about 2 to about 60 fold reduction in formation of water-insolubles, depending upon the specifics (e.g., mole % M-as-K, M/P ratio, and chill rate). Without being held to a particular theory, it is believed that the addition of borate may prevent or reduce crystallization of insoluble KMP upon chilling of the melt by blocking crystal nucleation or growth of KMP. Consequently, it has been discovered that the addition of borate may be used to produce a alkali metal polyphosphate composition that has a relatively high mole % M-as-K and a low amount of water-insoluble compounds. That said, the addition of borate is applicable at higher mole % M-as-K values. For example, the addition of borate may be effective at reducing the amount of water-insoluble impurities in potassium-containing polyphosphates having a mole % M-as-K from as low as about 33% up to 100% (KMP). In order to prepare relatively high potassium-containing polyphosphate with reduced water-insolubles (especially those with low or essentially no water insolubles), the mole % M-as-K is typically at least about 50% and no greater than about 95%. As such, the polyphosphate glass composition of the present invention may have a mole % M-as-K range of about 33% to about 100% but is usually at least about 50% and no greater than about 95%.

Typically, the concentration of the boron-containing glass-forming additive is such that melt/solid material comprises a concentration of anhydrous borate ($B_2O_3$) that is at least about 0.05% by weight of the melt/solid. Typically, the concentration of $B_2O_3$ does not exceed about 5% by weight of the melt/solid. Preferably, the melt/solid has concentration of ($B_2O_3$) that is at least about 0.2 wt % and no more than about 2 wt % of the melt/solid. More preferably, the concentration of ($B_2O_3$) is at least about 0.5 wt % and no more than about 1.5 wt % of the melt/solid.

Interestingly, it has been discovered that the addition of borate tends to produce an SKMP with some properties that are different than SKMP prepared at the same M/P ratio but without the addition of borate. Specifically, all other things being equal, a solution with dissolved borate-modified SKMP has a lower pH, an increased concentration of residual combined water, and the dissolved SKMP has a reduced chain length. The effect has been observed to be particularly pronounced at borate levels of about 1.0% by weight and greater. As such, in certain embodiments the composition of the melt/solid is selected so that the concentration of borate is no greater than about 1 wt % and at least 0.05 wt %, 0.2 wt %, or 0.5 wt %. Without being held to a particular theory, it is believed that at least some of the borates are incorporated into the polyphosphate chains and the resulting B—O—P linkages are more hydrolytically unstable than P—O—P linkages and hydrolyzed essentially immediately upon dissolution of the borate-containing SKMP, which results in the SKMP chain being cut in two, increased residual combined $H_2O$, and a lower pH. If desired, it is believed that this phenomenon may be counteracted, at least to some extent, by reducing the M/P ratio of the glass.

In view of the foregoing, the method of preparing the potassium-containing polyphosphate glass composition of the present invention comprises: cooling a melt comprising the standard constituents of potassium, sodium (if desired), and phosphate plus borate; and cooling the melt to a temperature below the glass transition temperature for the particular composition to solidify the melt; thereby forming a solid potassium-containing polyphosphate glass that has reduced water insolubles. Stated another way, the present invention may be practiced to reduce the formation of water-insolubles so that potassium-containing polyphosphate glass compositions with relatively high amounts of potassium and relatively low amount of insolubles (e.g., less than 10% by weight, preferably less than 5% by weight, and more preferably less than 2% by weight) may be produced.

The melt is formed by mixing the various ingredients and heating the mixture to a temperature sufficient to liquefy the ingredients. Additionally, the materials may be melted and mixed together at essentially any time during the process but preferably there is sufficient time after the addition of all the materials to ensure that the melt has a substantially uniform composition at the time it is cooled. For example, all the starting materials may be mixed together and then added to a furnace to form the melt or one or more of the starting materials may be heated to form a melt and the boron-containing additive is added thereto and allowed to liquefy and disperse throughout the melt. Typically, it is preferred to uniformly mix all the ingredients together and then apply the heat simply to ease the handling and processing. The starting mixture may be solid, an aqueous solution or a liquor, a slurry, a combination thereof. It is to be noted, that the potassium/sodium ratio and the M/P ratio of the combined starting materials, unless some type of purification/removal process is performed, is substantially the same in the melt and in the solidified material. Thus, to produce a polyphosphate glass having a particular nominal M/P ratio and mole % M-as-K, the starting materials and their relative amounts are typically selected so that the combination of starting materials have the desired nominal values.

So long as the desired M/P ratio and mole % M-as-K are achieved, the selection of the starting materials is not overly critical. That said, if the polyphosphates to be made are to be used in food applications, food grade materials are typically preferred, if available. Nevertheless, food grade raw materials are not required for to prepare polyphosphates for food applications so long as the polyphosphates meet food grade specifications. Thus, the starting materials and their amounts are selected such that resulting polyphosphate glass comprises the desired amounts of potassium, sodium (if desired), phosphate, and borate.

A mixture capable of providing the appropriate amounts of potassium, sodium (if desired), phosphate, and borate may be formed by selecting combinations of appropriate compounds such as those typically used to make polyphosphate glasses. Typically used compounds to prepare the mixture may be for example, phosphoric acid ($H_3PO_4$), dipotassium hydrogen phosphate ($K_2HPO_4$), disodium hydrogen phosphate ($Na_2HPO_4$), tripotassium phosphate ($K_3PO_4$), trisodium phosphate ($Na_3PO_4$), sodium carbonate ($NaCO_3$), potassium carbonate ($KCO_3$), and disodium pyrophosphate ($Na_2H_2P_2O_7$), etc. Chloride salts (e.g., NaCl and KCl) may be used with phosphoric acid but usually steam is blown through the melt to remove residual chloride as HCl. Phosphoric acid in which the phosphate is already partially polymerized, i.e., 115% phosphoric acid, etc., may also be used. For example, an appropriate mixture could be prepared from monopotassium phosphate, monosodium phosphate, and dipotassium phosphate; from phosphoric acid, sodium hydroxide, and potassium hydroxide; etc. Partially polymerized phosphates, i.e., pyrophosphates and higher phosphates may also be used as starting materials, but are not preferred.

Boron-containing glass-former additives may be any appropriate boron-containing compound such as borates. If it is desired to provide the raw materials in a liquid form, many boron-containing glass-former additives are advantageously generally water-soluble. Data on boron-containing compounds may by found in the CRC Handbook of Chemistry and Physics, Lange's Handbook of Chemistry, and other common reference sources known to one of skill in the art. Boron-containing glass-formers suitable for use as an additive for reducing insolubles may be, for example, boric oxide ($B_2O_3$), tetraborates (e.g., sodium tetraborate ($Na_2B_4O_7$ or $Na_2O.2B_2O_3$), and potassium tetraborate ($K_2B_4O_7$)), metaborates (e.g., $NaBO_2$), pentaborates (e.g., potassium pentaborate ($KB_5O_8$) and ammonium pentaborate ($NH_4B_5O_8$), boric acids (e.g., $H_3BO_3$ sometimes written $B(OH)_3$ or alternatively as $0.5(B_2O_3.3H_2O)$) metaboric acid ($HBO_2$), and tetraboric acid or pyroboric acid ($H_2B_4O_7$)), etc. Other suitable boron-containing additives include hydrated forms of the boron-containing compounds listed above. Borate salts may contain either Na or K as a cation, but cations of such borate salts are not limited to only Na and/or K. Experimental results to date indicate that boric oxide, boric acids, and tetraborates are slightly more effective in reducing insolubles than metaborates or pentaborates.

Additionally, depending upon the desired application of the glassy polyphosphates of the present invention, it may be desirable to include other compounds in the melt. For example, it may desirable to include compounds that result in the polyphosphate glass also comprising CaO, $Fe_2O_3$, ZnO, etc.

The mixture may be formed or placed in a vessel that can withstand the heating conditions, such as a ceramic or alumina vessel, and heated in an appropriate apparatus, such as a muffle furnace. On an industrial scale, the process may be carried out in a bigger furnace, e.g., 8 feet (about 2.4 M) wide by 15 feet (about 4.6 M) long, lined with zircon ramming mix on the bottom designed to withstand a melt temperature of at least 800° C. The mixture is heated to a temperature sufficient to melt the mixture and maintained in the molten state for a duration sufficient to drive of volatiles, water, etc. and form a generally clear melt. This is typically accomplished by heating the mixture to a temperature that is above about 600° C. for a duration that is as long as about two hours. That said, there is a general inverse relationship between temperature and duration such that increasing the temperature may allow for decreasing the duration. Notwithstanding, the temperature of the melt generally does not exceed about 1,100° C. Preferably, the materials are heated to a temperature of at least about 750° C. not greater than about 1,000° C. The duration of the heating process is typically at least about 6 minutes and no longer than about 90 minutes.

The particulars of the heating process are not believed to be overly critical. It is believed that essentially any particular process to yields a substantially uniform melt composition substantially free of volatiles, water, etc. is sufficient. For example, the heating process need not consist of heating to a particular temperature and holding there until the melt is quenched, it may be performed in multiple stages each involving heating or cooling the material to a particular temperature for a particular duration. Alternatively, the heating process may involve increasing the temperature at a relatively constant rate or a variable rate. Further, the heating process can be carried out batchwise, continuously, or semi-continuously. After heating, the reaction mixture containing the polyphosphate is, preferably, rapidly cooled to or below its glass transition temperature to avoid or reduce crystal growth.

Advantageously, one or more benefits of the present invention may be realized when performed on a commercial scale (as opposed to those in a laboratory setting). In particular, the present invention may be implemented on a commercial scale because the use of boron-containing glass-forming additives are compatible with current procedures for the commercial preparation of polyphosphate glasses with little or no additional equipment or procedures required. Further, this method is compatible with cooling rates typical of larger-scale commercial preparation. Essentially, the only modification to equipment or procedures necessary is whatever is needed add the boron-containing additive to the mixture of materials being heated to form the melt.

In one embodiment, the potassium-containing polyphosphate glassy compositions of the invention contain less than 10% by weight, preferably less than 5% by weight, and more preferably less than 2% by weight, of material that is insoluble in water at room temperature. Additionally, x-ray diffraction analysis of the soluble material produced thus far indicates that it is glassy, amorphous, vitreous, etc. Aqueous solutions made with about 1% to about 2% w/v potassium-containing polyphosphate composition not modified with borate have pH values between about 6.0 and about 8.0. As mentioned above, the addition of borate, other things being the same, tends to produce a solution with a lower pH.

The solubility of potassium-containing polyphosphate glass compositions is also a useful property for its addition to beverages or for its application through the use of sprays to food, food processing equipment, and food contact surfaces. Potassium-containing glass compositions with high mole % M-as-Na have a lower insolubles content than potassium-containing glass compositions with high mole % M-as-K. The absence of, or at least low, insoluble content in materials for food preparation and processing is desirable, as the presence may affect the organoleptic properties, such as the texture or perceived quality of the food; and may affect processing, such as filtration of the polyphosphate solution.

Food Applications

Antimicrobial polyphosphates have numerous applications in food processing where bacterial contamination of food is a major problem, as described in U.S. Pat. Nos. 6,440,482; 6,509,050; and 6,610,340. Bacteria must be controlled throughout the food processing process, for example: (1) in processed food, including beverages, to prevent the growth of spoilage organisms and pathogens during distribution and storage; (2) surface treatment of foods to disinfect the surface and kill spoilage organisms and pathogens located on the surface of the food; and (3) in food processing plants, such as dairy, meat, and poultry processing facilities, to kill spoilage organisms and pathogens in the food processing equipment. As used herein, "food" means any liquid, solid, semi-solid, dispersion, suspension or emulsion, including those controlled by the Federal Food, Drug, and Cosmetic Act, which are consumable by mammals (including animals and humans), fish and other marine life, and fowl, whether or not having nutritive value, and which are susceptible to microbial growth. Specific examples include proteinaceous substances and/or carbohydrates, beverages, edible oils and water, including directly consumable water, e.g., bottled water, and water used to prepare, process, or transport other food forms.

Polyphosphate compositions are advantageous for food-related applications in that they are able to control microorganism growth without harsh or corrosive properties. Polyphosphates are effective against bacterial strains, including *E. coli* O157:H7; *Staphylococcus aureus; Salmonella typhimurium; Listeria monocytogenes; Pseudomonas aeruginosa; Clostridium botulinum*; and *Clostridium perfringens* (U.S. Pat. No. 6,509,050). An additional advantageous feature of antimicrobial polyphosphates in food-related applications is that they can be consumed or ingested without harmful consequence, when approved for food use and used according to good manufacturing practices. Polyphosphates such as SKMP may be added directly to food products so that they become part of the finished product to be consumed without the need for further rinsing. Antimicrobial polyphosphates may also be used in cleaning compositions, either to wash fruits, vegetables, and animal carcasses or to clean and sanitize food processing equipment without the need for further rinsing. Because these compositions control pathogens at near neutral pH conditions using very dilute preparations, these compositions are safer to handle and have fewer disposal problems than highly alkaline or highly acidic compositions. Also, physicochemical changes in food (color, texture, flavor, nutrient retention) that may occur at highly alkaline or highly acidic conditions are reduced.

Compositions that are inhibitory to microorganisms may range from 0.05% to 3% by volume, preferably from 0.1% to 1% by volume of long chain polyphosphates (e.g., $n \geq 3$), and more preferably from 0.1% to 0.5% by volume of long chain polyphosphates with an average chain length (n) that is greater than 6 in beverages or solutions used to treat foodstuff such as meat, seafood, or poultry. The treatment of the food may involve addition of the composition to the food such that the composition becomes distributed inside the food (e.g., injection, tumbling). Alternatively, the composition may be added only to the surface of the food or a combination of both treatments may be employed.

Other advantages of polyphosphates include preserving the color and vitamin content of fruits and vegetables, raw and uncooked meat poultry, and seafood products. Polyphosphates also provide moisture retention, flavor protection, and emulsion stability to meat and poultry products. In beverage and dairy applications, SKMP delivers sequestration of metal cations such as calcium, magnesium, copper, and iron, an enhanced flavor profile, stabilization of color, protein, and minerals, and increased shelf life.

Polyphosphates and Organic Acids

Optionally, the polyphosphates may be combined with at least one organic acid and/or at least one salt of an organic acid, for synergistic antimicrobial action in foods as described in U.S. Pat. No. 6,509,050. An antimicrobial synergy exists between phosphates and organic acids and/or salts of organic acids, especially lactic acid and/or its salts, such that the effective total concentrations required to obtain microbial efficacy in meat, poultry, and seafood products will be reduced. In such application, the polyphosphate preferably has an average chain length that is at least 3 and no greater than about 100, and is a sodium salt, a potassium salt, a mixed sodium/potassium salt, a mixture of sodium and potassium salts, or a mixture of sodium, potassium, and mixed sodium/potassium salts. Suitable organic acids are edible organic acids, such as lactic acid, citric acid, acetic acid, malic acid, fumaric acid, etc., and the salts thereof likewise are edible salts. Sodium and potassium salts of edible organic acids are preferred. Salts of lactic acid are more preferred. These acids and/or salts are generally added so that the resulting meat, poultry, or seafood product comprises about 0.3% to about 7% by weight of the total weight of the food composition, preferably about 1% to about 3%, more preferably about 0.3% to about 2.0%, by weight of the total weight of the food composition.

Beverages

As disclosed in Henson et al. (U.S. Pat. No. 6,440,482), polyphosphates are added to beverages to inhibit the growth of microorganisms such as yeast, mold, and bacteria. Polyphosphates in which the mole % M-as-K is 33% to 100%, and in which the average chain length is greater than 10, and have sufficient solubility to be useful in beverages are considered to be particularly effective in controlling microorganisms and have sufficient solubility to be useful in beverage applications. These materials can be used in addition to, or in place of sodium polyphosphates in beverages to decrease sodium content of beverages, making them more acceptable to users who require a low sodium beverage. Advantageously, SKMP with increased substitution of K for Na also provides an added source of dietary potassium. Other advantageous properties and functions include high solubility in water, dispersion, sequestration of polyvalent cations (e.g., calcium) to reduce or prevent their precipitation, emulsification of protein, deflocculation, and protein stabilizer (especially in milk and soy-based beverages). Polyphosphates in beverages serve as both a partial replacement for benzoate and a sequestrant for metal ions that may catalyze benzene formation from the reaction of benzoate and ascorbic acid. SKMP also imparts an improved flavor profile in some juice drinks compared to other SHMP or other preservatives.

The preparation of beverages and the materials used therein is well known to those skilled in the art and has been described in numerous patents and publications, such as, Nakel, U.S. Pat. No. 4,737,375, which emphasizes the preparation of carbonated beverages; Calderas, U.S. Pat. No. 5,431,940, and Pflaumer, U.S. Pat. No. 5,641,532, both of which emphasize the preparation of non-carbonated juice beverages. For example, beverages may be prepared by making a beverage concentrate, adding to it a sugar syrup containing the polyphosphate of this invention, including the acidulants, preservatives, and water in amounts sufficient to obtain the desired beverage composition. The concentrate is prepared by admixing a dispersion of the flavor oil in ester gum and a dispersion of a hydrocolloid such as gum acacia in water, then homogenizing to form a stable emulsion of the flavor oil. Preservatives, acidulants, and coloring material may also be added to the concentrate. The sugar syrup may be prepared by mixing, for example, a sugar source such as high fructose corn syrup with water, then adding to it any optional water soluble vitamins, the polyphosphate, acidulants, and preservatives. The sugar syrup and concentrate are combined to form a non-carbonated beverage. It can then be packaged and stored.

Polyphosphates are effective in inhibiting the growth of microorganisms in beverages when present in the beverage at about 100 ppm to about 5000 ppm, typically about 300 ppm to 3000 ppm, preferably about 500 ppm to about 1500 ppm, and more preferably about 1000 ppm. Non-carbonated beverages may comprise 0.1 to 40%, preferably 1 to 20%, and more preferably 2% to 10%, and most preferably 3% to 6% fruit juice (weight percentage based on volume of single strength 1-16 Brix fruit juice). The juice may be any citrus juice, non-citrus juice, or a mixture thereof, which is known for use in non-carbonated beverage. Non-fruit juices, such as vegetable or botanical juices, and tea solids also can be used in non-carbonated beverages. When tea solids are used, the non-carbonated beverage typically comprises preferably about 0.02 to about 0.25%, more preferably about 0.07% to about 0.15%, by weight of tea solids. The term "tea solids" as used herein means solids extracted from tea materials including those materials obtained from the genus *Camellia*, including *C. sinensis* and *C. assaimica*.

Non-carbonated beverages have a pH of from about 2.5 to about 4.5, preferably from about 2.7 to about 4.0. This pH range is typical for non-carbonated dilute juice beverage products. Beverage acidity can be adjusted to and maintained within the requisite range by known and conventional methods, e.g., the use of food grade acid buffers. Typically, beverage acidity is a balance between maximum acidity for microbial inhibition and optimum acidity for the desired beverage flavor and impression of sourness. Non-carbonated beverages typically contain an artificial or natural, caloric or noncaloric, sweetener. Preferred are carbohydrate sweeteners, more preferably mono- and or disaccharide sugars, such as maltose, sucrose, glucose, fructose, invert sugars and mixtures thereof. The non-carbonated beverage products typically comprise from about 0.1% to about 20%, more preferably from about 6% to about 14%, sugar solids by weight of the beverage products. Artificial or noncaloric sweeteners include, for example, saccharin, cyclamates, acetosulfam, L-aspartyl-L-phenylalanine lower alkyl ester sweeteners (e.g., aspartame), and the like. The sweetener can be provided to some extent by the other components, such as the fruit juice.

Non-carbonated beverages may also comprise any other ingredient or ingredients typically used as optional beverage ingredients, such as flavorants, preservatives (e.g., organic acids), colorants and so forth. Preservatives commonly used in beverage products include, for example, sorbates, benzoates, organic acids, and combinations thereof. Preferred preservatives are sorbic acid, benzoic acid, alkali metal salts thereof, and mixtures thereof. Typically about 400 ppm to about 1000 ppm, more typically about 650 ppm to about 750 ppm, of preservative is added to the beverage, but use of the antimicrobial long chain polyphosphate of this invention in the beverage will allow this amount to be reduced. The balance of the beverage is added water. Added water does not include the water incidentally included in the beverage by other added materials, such as fruit juice or sugar syrup. Although the high potassium polyphosphate of this invention can be used with added water of any hardness typically used to prepare beverages, the added water typically comprises 0 to about 180 ppm hardness.

Non-carbonated beverages may contain up to 110% of the U.S. Recommended Daily Allowance (RDA) of vitamins and minerals, provided that such vitamins and minerals are chemically and physically compatible with the essential elements of the non-carbonated beverage products and do not cause the growth of microorganisms. Preferred are vitamin A, provitamins thereof (e.g., β-carotene), and ascorbic acid. Preferred polyvalent cations for use in fortifying beverages include calcium, iron, magnesium, and combinations thereof. Although these polyvalent cations may bind to and render inactive the polyphosphates with respect to their preservative effect, inactivation by polyvalent cations can be overcome by adding additional polyphosphate. Gums, emulsifiers and oils, such as guar gum, xanthan, alginates, mono- and di-glycerides, lecithin, pectin, pulp, cottonseed oil, vegetable oil, food starches, and weighting oils/agents, as well as esters and other flavor and essence oils may also be included.

Meat, Poultry and Seafood

As disclosed in Henson et al. (U.S. Pat. Nos. 6,610,340, 6,440,482, and 6,509,050) polyphosphates are added to meat, poultry, and seafood to improve the functional properties of food, particularly its moisture retention. In addition, this prevents a decrease in nutritional value by retaining soluble proteins, minerals, and vitamins. Glassy polyphosphates are commonly used for the preparation of various muscle foods such as ham, bacon, and luncheon meats. Muscle foods refers to meat products derived primarily from the animal muscle (bovine, porcine, or seafood). Polyphosphates may be effective at concentrations of about 0.1% to about 2% by weight, preferably about 0.1% to about 0.5% by weight in the final meat, poultry, or seafood product. Because the total amount of polyphosphate and acid and/or salt added is reduced, it is less likely that these materials will cause changes in the aesthetic properties of the meat, poultry, and seafood products.

In the preparation of these muscle foods, the common method is to prepare a brine or pickle comprising water, salt (e.g., sodium chloride), up to about 10% by weight polyphosphate, and optionally, ingredients such as curing salts (nitrites or nitrates), sweeteners or bulking agents, (sugar, dextrose, corn syrup solids, corn syrup, maltodextrins, etc.), flavoring agents including liquid smoke and spices, and preservatives. The solution may also comprise a salt of an edible acid, such as citric acid, lactic acid, acetic acid, malic acid, ascorbic acid, gluconic acid, etc., especially a sodium and potassium salt. Typically, about 5% to about 20% by weight of brine solution is added to the muscle food, based on the weight of the muscle food before addition of the brine solution. Preferably, about 10% to about 12% by weight of brine solution is added to the muscle food, based on the weight of the muscle food before addition of the brine solution.

It is recommended that the polyphosphate be dissolved in the water first. Salt is usually added after the polyphosphate is completely dissolved, followed by the rest of the ingredients. After the brine or pickle is prepared, it is generally cooled to about 40° F. (about 4° C.) or lower before being introduced to the muscle. Typically, the concentration of the polyphosphate composition in the brine is adjusted so that the concentration of the polyphosphate composition will be about 0.1% to about 0.5% by weight in the final muscle food product. Typically, the concentration of salt in the brine is adjusted so that the concentration of salt in the final muscle food product will be about 0.8% to about 2.5% by weight.

In the process of cooling the brine or pickle, salt and polyphosphates may precipitate out if the brine or pickle is especially concentrated and if the water used has a high level of hardness. Similarly, storing the brine or pickle at room temperature over an extended period of time can trigger premature precipitation of the salt or polyphosphate. The addition of the polyphosphate to the brine or pickle either by itself or as one of the components of a phosphate blend reduces or eliminates the precipitation of the brine or pickle prior to being added to the muscle. The potassium-containing polyphosphate composition of the invention can be used in addition to, or in place of sodium polyphosphates in muscle food to reduce the amount of sodium added.

The solution comprising the polyphosphate may be added to the muscle food by methods and devices well known to those skilled in the art of meat processing. Addition of the solution comprising polyphosphate to the muscle food may be achieved either through injection machines, mixing directly with the muscle in a tumbler or mixer, or combinations thereof. The solution comprising polyphosphate may be injected into a carcass using any number of commercially available injection devices. Injection of the solution into a carcass must be accomplished before the onset of rigor mortis. The solution temperature may range from about −2° C. to about 40° C., preferably below 10° C., and more preferably below 4.4° C. Preferably the carcass is injected with about 10 to about 20% of its weight of the polyphosphate solution, more preferably with about 10% to about 12% of the solution. Alternatively, the solution comprising the polyphosphate may be added to muscle food by perfusion into the carcass. In pork, poultry, beef, or lamb, the perfusion can be through any major blood vessel that affords perfusion into the majority of meat in the carcass. The carcass may be tumbled after treatment to mix and afford more nearly uniform distribution of the phosphate solution. Tumbling apparatus is used throughout the meat-processing industry and is well known to those skilled in the art.

The addition of an aqueous solution, by injection or perfusion, of a composition comprising a polyphosphate into an animal carcass in the early postmortem period improves the appearance, water-holding capacity and organoleptic quality of the resulting muscle product. In meat muscle products, particularly in pork, the treatment greatly inhibits pale, soft, exudative condition (PSE), a condition in which the muscle product becomes very pale, stiff, and watery, and loses its water holding capacity. For any carcass treated, the aqueous solution has a concentration of up to 10% by weight total polyphosphate or salts, preferably about 5% to about 10% by weight, depending on the desired amount of solution and polyphosphate perfused or injected into the carcass. It is preferred that the carcass contain about 0.1% to about 0.5% by weight added phosphate, preferably about 0.3% to about 0.4% by weight added phosphate. Addition of excess polyphosphate does not further improve the condition of the carcass and may produce adverse effects, such as dark, firm, dry condition (DFD) in the muscle, or impart a soapy flavor. Preferably, the aqueous solution has a pH greater than or equal to about 6, more preferably greater than or equal to about 7, and most preferably greater than or equal to about 8.

Addition of chloride salts enhances protein solubility, thereby acting synergistically with the added phosphates to improve the water holding properties of the muscle fibers in the carcass. Optionally, sodium chloride may be added to the carcass by dissolving it in the aqueous solution and injecting this solution to the carcass. It is preferred that the carcass contain less than 0.5% added sodium chloride, preferably less than or equal to 0.3% sodium chloride. Potassium chloride may be used in place of sodium chloride.

Dairy and Other Food Products

The high potassium polyphosphate can be used to produce a reduced sodium food in any other food application in which sodium phosphates are normally used.

These applications include, for example: imitation dairy products, such as non-dairy creamers, whipped toppings, and frozen desserts; dairy products, such as milk, cream, cheese, whey, and ice cream; egg whites; dried and canned fruit; jellies and jams; and gums, such as carrageenan. Food applications of polyphosphates are described in U.S. Pat. No. 6,440,482 and references incorporated therein.

Cleaning Compositions

As disclosed in Henson et al. (U.S. Pat. Nos. 6,440,482 and 6,509,050), antimicrobial polyphosphates can be used in cleaning compositions for food, food processing equipment, and food contact surfaces. These materials are a non-corrosive alternative to harsher antimicrobial agents that have limited use in controlling bacteria on the surface of food, in food processing plants, and that can be incorporated into food to protect it from bacterial contamination and growth during storage and distribution. These compositions are safer to handle and have fewer disposal problems than highly alkaline or highly acidic compositions. These compositions can be used to wash the surface of, for example, fruits, vegetables, animal carcasses, food cutting equipment, food preparation tables, packaging material, among others. Because these compositions control pathogens at near neutral pH conditions using very dilute preparations, the physicochemical changes that may occur at highly alkaline or highly acidic conditions are reduced. Washing the surface of fruits and vegetables products with cleaning compositions comprising dilute preparations of antimicrobial polyphosphates helps to avoid wilting and helps to preserve their color and vitamin content. Similarly, changes to the color, flavor, and texture of the surface of animal carcasses are minimized. Surface treatments may be carried out on both cooked and raw products. Raw products may be sold as is or further used as a raw material for cooked products. Cooked products with surface treatment can be packaged for distribution.

The cleaning compositions comprise a mixture of sodium and/or potassium polyphosphates and, optionally, sodium and/or potassium orthophosphates, one or more surfactants, such as a linear alkylbenzene sulfonate (LAS), a salt of fatty acid, an alcohol ethoxylate, etc. Surfactants are disclosed in Industrial Applications of Surfactants, D. R. Karsa, ed., The Royal Society of Chemistry, London, 1987, and similar textbooks. The cleaning compositions have a pH of from about 4 to about 11, are effective against broad classes of microorganisms including gram-positive and gram-negative bacteria, especially those responsible for foodborne diseases and spoilage of meat and fresh produce.

The polyphosphates have a chain length of two or higher. Preferably, the composition contains a mixture of mono-, di- and/or tri-sodium and/or potassium orthophosphate, a linear long chain sodium and/or potassium polyphosphate (chain length 6-50), and a surfactant or a combination of surfactants that are stable over a pH range of about 4 to about 11. The compositions may also comprise ethylene diamine tetraacetic acid (EDTA), and/or its salts, and other chelating agents, such as citric acid lactic acid, ascorbic acid and other polycarboxylic acids, and/or their sodium, potassium, and/or calcium salts. The compositions may also comprise low concentrations about 50 to about 200 ppm of peroxy compounds, such as peracetic acid and hydrogen peroxide.

The compositions may be prepared either as a solution, a concentrate, or in dry form to be reconstituted with water at the point of use. Food grade materials should be used to prepare the cleaning compositions. The cleaning composition may be used as a topical spray or as a dip treatment. The cleaning compositions maintain their antimicrobial efficacy at a pH from about 4 to about 11. Commercially available products typically require a pH of 10.5 to 12. Because of the lower pH, the composition is less likely to be caustic to skin, eyes, and respiratory passages upon contact or inhalation. In addition, the lower pH reduces the apparent slimy/viscous texture of the composition. The compositions are effective even when prepared with hard water.

Other Applications

In addition to food applications, the water-soluble potassium-containing polyphosphates (e.g., SKMP and KMP) produced in accordance with the present invention may also be useful in a variety of technical and industrial applications. such as, for example, sequestration, threshold inhibition, deflocculation, dispersion, etc.

In sequestration, hardness ions such as Ca, Mg, Fe, Cu, etc. combine with polyphosphates to form stable, water-soluble complexes. Sequestration prevents precipitation or undesirable side reactions of the metal ion. Water-soluble sodium-potassium or potassium polyphosphates sequester especially well near neutral pH. Similarly, water-soluble polyphosphates may be used to treat or "soften" potable and industrial waters (e.g., in cooling systems, printing, dyeing) to prevent "red" and "black" water (caused respectively by Fe and Mn), to prevent or reduce the formation of scale in condensers, heat exchangers, pipes, and boilers, and to inhibit corrosion (e.g., prevent leaching of Pb and Cu from pipes).

The inclusion of water-soluble polyphosphates in cleaning applications may provide additional benefits such as binding calcium, magnesium, and iron ions that would interfere with the detergent action, and the dispersion of soil particles in the wash water and preventing their redeposition. For textile-related cleaning applications the water-soluble polyphosphates may be used for laundry boosters, water conditioners, and as anti-redeposition agents to prevent dirt from redepositing on fabric. For personal care applications, the water-soluble polyphosphates may be included, for example, in bath beads and cosmetics.

In threshold inhibition, the polyphosphates are believed to prevent the formation of scale by interfering with crystal nucleation and/or growth. To accomplish threshold inhibition, the concentration(s) of the water-soluble polyphosphoric acid(s) is typically well below that required for sequestration (e.g., typically as little as 2-4 ppm of water-soluble polyphosphate is needed to inhibit the formation of calcium carbonate scale).

The water-soluble polyphosphates may also aid in deflocculation of colloidal particles. For example, certain fine clay particles are attracted to one another by virtue of their electrostatic charge distributions. Polyphosphates affect the electrostatic charge distributions by adhering to the particle surface, causing the particles to repel one another. The deflocculated particles tend to remain suspended in water and exhibit little tendency to settle or clump together.

Further, such polyphosphates may be used as dispersants for clay extraction and processing, oil-drilling muds, dyes, and pigments. Specifically, the polyphosphates tend to deflocculate and disperse clay solids, thereby converting them from a solid mass to a pumpable slurry. In a similar fashion, the deflocculation of oil well drilling muds by polyphosphates may be used to generate a high specific gravity (high % solids) and low viscosity material that is more readily pumped. Other mining applications include use as a deflocculant in grinding, classification, and separation operations such as flotation. In ceramic and refractory applications, polyphosphates provide high-temperature bonding in the finished product and act as effective dispersants in the precursor slurries. Such polyphosphates may be used for dispersing pigments for water-based paper coatings and paints, and for water treatment and preparation of hides for tanning leather. Such polyphosphates may also be used improve the efficiency of photographic film development by chelating foreign metal ions.

The relative high-potassium content of SKMP and KMP may be especially useful in the formulation of products in liquid form. Household and industrial and institutional cleaners, for example, are often formulated in liquid form and a high potassium-to-sodium ratio usually translates to relatively more stable products.

The relatively high-potassium content of SKMP and KMP of the present invention may be especially useful in the formulation of products in liquid form. Household and industrial and institutional cleaners, for example, are often formulated in liquid form and a high potassium-to-sodium ratio usually translates to relatively more stable products.

EXAMPLES

The following examples illustrate the methods of preparing polyphosphates with high potassium to sodium ratios as well as polyphosphates with high potassium to sodium ratios and low quantities of insolubles. Further, the examples illustrate the ability of the method of the present invention to decrease the amount of insolubles in polyphosphates with a relatively high ratio of potassium to sodium.

Example 1

The following example illustrates the preparation of SKMP with a relatively high potassium to sodium ratio without the addition of glass-former additives, and the amount of insolubles present in the resulting glass when either a rapid or slow rate of cooling is used to solidify the melt.

The sodium and potassium phosphates in the quantities and proportions indicated in Table 1 were mixed together in an uncovered inert metal dish and heated to 900° C. for 10-20 minutes in a muffle furnace. The total final weight of the melt in each instance was 50.0 g. In this example, the melts were subjected to a "fast chill" that was achieved by pouring about one-half of resulting melt between two large copper chill plates and then the second half was quenched the same way. Each chill plate is at ambient temperature, weighs approximately 19 kg and has dimensions of ⅞ inch×12 inches×12 inches. A person skilled in the art will readily appreciate that differences in the weight of the melt, the temperature of the chill plate, the weight of the chill plate, and/or dimensions of the chill plate will introduce variations in the chill rates.

TABLE 1

| Sample | mole %<br>M-as-K | Target M/P | MKPA*<br>(g) | DKPA<br>(g) | MSPM*<br>(g) |
|---|---|---|---|---|---|
| 088-3 | 66 | 1.03 | 37.05 | 2.30 | 21.22 |
| 088-4 | 66 | 1.04 | 36.11 | 3.05 | 21.35 |
| 088-7 | 66 | 1.07 | 33.35 | 5.28 | 21.73 |
| 088-10 | 66 | 1.10 | 30.65 | 7.46 | 22.10 |
| 088-13 | 66 | 1.13 | 28.01 | 9.59 | 22.46 |
| 088-18 | 66 | 1.18 | 23.73 | 13.05 | 23.05 |
| 088-23 | 66 | 1.23 | 19.59 | 16.40 | 23.62 |
| 031-02 | 76 | 1.00 | 45.28 | 0.00 | 14.50 |
| 089-3 | 76 | 1.03 | 42.58 | 2.26 | 14.77 |
| 089-4 | 76 | 1.04 | 41.69 | 3.00 | 14.85 |
| 089-7 | 76 | 1.07 | 39.07 | 5.20 | 15.11 |
| 089-10 | 76 | 1.10 | 36.51 | 7.35 | 15.37 |
| 089-13 | 76 | 1.13 | 34.00 | 9.45 | 15.62 |
| 089-18 | 76 | 1.18 | 29.94 | 12.85 | 16.02 |
| 089-23 | 76 | 1.23 | 26.02 | 16.13 | 16.41 |
| 023-2 | 86 | 1.00 | 50.53 | 0.00 | 8.34 |
| 090-3 | 86 | 1.03 | 47.96 | 2.23 | 8.49 |
| 090-4 | 86 | 1.04 | 47.12 | 2.96 | 8.54 |
| 090-7 | 86 | 1.07 | 44.63 | 5.12 | 8.69 |
| 090-10 | 86 | 1.10 | 42.19 | 7.24 | 8.83 |
| 090-13 | 86 | 1.13 | 39.81 | 9.31 | 8.97 |
| 090-18 | 86 | 1.18 | 35.96 | 12.65 | 9.20 |
| 090-23 | 86 | 1.23 | 32.25 | 15.88 | 9.42 |

*MKPA is monopotassium phosphate anhydrous
**DKPA is dipotassium phosphate anhydrous
***MSPM is monosodium phosphate monohydrate The amount of water-insoluble material (wt % insolubles) was determined gravimetrically in the following manner as shown in Table 2. Approximately 10 g of SKMP is ground with a mortar and pestle and dissolved in water (100 ml). If, however, the insolubles level is high (generally above ~5-6%), the insolubles determination is made with ground SKMP (~2 g) in water (50 ml). The solution is vacuum filtered using a Gooch crucible and filter paper (pre-dried at 105° C. for at least 2 hr). The filtered solids are washed with an additional small amount of water. The Gooch filter is dried at 105° C. 2 hr. The difference in weight before and after filtering represents the water-insolubles.

TABLE 2

66 mole % M-as-K FAST CHILL

| | | Sample | | | | | | |
|---|---|---|---|---|---|---|---|---|
| | none | 0176-<br>088-3 | 0176-<br>088-4 | 0176-<br>088-7 | 0176-<br>088-10 | 0176-<br>088-13 | 0176-<br>088-18 | 0176-<br>088-23 |
| Target M/P | 1.00 | 1.03 | 1.04 | 1.07 | 1.10 | 1.13 | 1.18 | 1.23 |
| wt % insolubles | — | 0.08 | 0.07 | 0.04 | 0.04 | 0.05 | 0.02 | 0.02 |

TABLE 2-continued 76 mole % M-as-K FAST CHILL

| | Sample | | | | | | | |
|---|---|---|---|---|---|---|---|---|
| | 0359-031-02 | 0176-089-3 | 0176-089-4 | 0176-089-7 | 0176-089-10 | 0176-089-13 | 0176-089-18 | 0176-089-23 |
| Target M/P | 1.00 | 1.03 | 1.04 | 1.07 | 1.10 | 1.13 | 1.18 | 1.23 |
| wt % insolubles | 0.72 | 0.64 | 0.42 | 0.78 | 0.36 | 0.51 | 0.28 | 0.14 |

86 mole % M-as-K FAST CHILL

| | Sample | | | | | | | |
|---|---|---|---|---|---|---|---|---|
| | 0359-023-02 | 0176-090-3 | 0176-090-4 | 0176-090-7 | 0176-090-10 | 0176-090-13 | 0176-090-18 | 0176-090-23 |
| Target M/P | 1.00 | 1.03 | 1.04 | 1.07 | 1.10 | 1.13 | 1.18 | 1.23 |
| wt % insolubles | 15.26 | 9.40 | 6.76 | 4.44 | 4.92 | 2.18 | 0.92 | 0.23 |

FIG. 1 is a graph of the percent insoluble content present in SKMP glass over a range of 66 to 86 mole % M-as-K when prepared with rapid cooling of the melt. Insolubles as a percentage of the SKMP glass increased with increasing K content as measured in mole % M-as-K for M/P mole ratios ranging from 1.03 to 1.23.

The products were also analyzed as shown in Tables 3-5 using methods generally employed by those skilled in the art. The percent by weight of potassium (wt % K) and percent by weight of sodium (wt % Na) were determined by ion chromatography. Furthermore, the percent by weight of potassium (wt % K) and percent by weight of sodium (wt % Na) were used to determine the Mole % M-as-K. The pH values of 2% w/v aqueous solutions of individual samples (pH) were also determined. The average chain length of phosphates (Ave. Chain Length), M/P mole ratio (Measured M/P), and percent by weight of $P_2O_5$ (wt % $P_2O_5$) were determined by titration after dissolution. The acid groups (—P—OH) associated with the dissolved polyphosphate are also determined by titration, and are expressed as the percent by weight of $H_2O$ (wt % $H_2O$). It is believed that acid groups arise from water that is incompletely removed during melting. Further, acid groups are believed to arise from hydrolysis of labile bonds upon dissolution. Bonds in polyphosphates or metaphosphates having an M/P mole ratio greater than about 1.00 are considered to be stable for purposes of the titration method. As a result, the percent by weight of $H_2O$ is believed to reflect essentially only the acid groups originally present in the glass. For phosphates having an M/P mole ratio less than about 1.00, labile cross-linked phosphate bonds are also present which hydrolyze almost immediately upon dissolution. Borate-phosphate bonds also hydrolyze upon dissolution. In these latter cases, the percent by weight of $H_2O$ reflects not only the acid groups originally present in the glass, but also acid groups acquired upon dissolution. In these cases, the average chain length, pH, and percent by weight of $P_2O_5$ are all expected to be higher in the undissolved glass than measured by titration of the dissolved glass. Titration is an accepted method of analysis since the glasses are primarily utilized when in aqueous solution. These same methods were also used to analyze the products in all the subsequent Examples.

TABLE 3

66 mole % M-as-K FAST CHILL

| Sample | Target M/P | Ave Chain Length | wt % $P_2O_5$ | Measured M/P | pH | wt % $H_2O$ | wt % K | wt % Na | Mole % M-as-K* |
|---|---|---|---|---|---|---|---|---|---|
| 0176-088-3 | 1.03 | 27.50 | 62.20 | 1.030 | 6.6 | 0.34 | 23.39 | 7.6 | 0.644 |
| 0176-088-4 | 1.04 | 21.02 | 62.11 | 1.040 | 6.7 | 0.43 | 23.14 | 7.32 | 0.650 |
| 0176-088-7 | 1.07 | 17.64 | 61.30 | 1.067 | 7.1 | 0.36 | 23.47 | 7.36 | 0.652 |
| 0176-088-10 | 1.10 | 13.11 | 60.52 | 1.106 | 7.2 | 0.36 | 24.56 | 7.74 | 0.651 |
| 0176-088-13 | 1.13 | 12.46 | 59.95 | 1.127 | 7.5 | 0.26 | 24.39 | 7.68 | 0.651 |
| 0176-088-18 | 1.18 | 9.65 | 58.88 | 1.172 | 7.7 | 0.26 | | | |
| 0176-088-23 | 1.23 | 7.48 | 58.10 | 1.235 | 7.9 | 0.24 | | | |

*Determined from Wt % K and Wt % Na.

TABLE 4

76 mole % M-as-K FAST CHILL

| Sample | Target M/P | Ave. Chain Length | wt % $P_2O_5$ | Measured M/P | pH | wt % $H_2O$ |
|---|---|---|---|---|---|---|
| 0359-031-02 | 1.00 | | | | | |
| 0176-089-3 | 1.03 | 26.34 | 61.30 | 1.029 | 6.7 | 0.37 |
| 0176-089-4 | 1.04 | | | | | |

TABLE 4-continued

76 mole % M-as-K FAST CHILL

| Sample | Target M/P | Ave. Chain Length | wt % $P_2O_5$ | Measured M/P | pH | wt % $H_2O$ |
|---|---|---|---|---|---|---|
| 0176-089-7 | 1.07 | 18.30 | 60.40 | 1.069 | 7.16 | 0.31 |
| 0176-089-10 | 1.10 | | | | | |
| 0176-089-13 | 1.13 | 11.70 | 59.10 | 1.126 | 7.42 | 0.34 |
| 0176-089-18 | 1.18 | | | | | |
| 0176-089-23 | 1.23 | 7.74 | 57.20 | 1.224 | 7.9 | 0.25 |

TABLE 5

86 mole % M-as-K FAST CHILL

| Sample | Target M/P | Ave. Chain Length | wt % $P_2O_5$ | Measured M/P | pH | wt % $H_2O$ |
|---|---|---|---|---|---|---|
| 0359-023-02 | 1.00 | | | | | |
| 0176-090-3 | 1.03 | 30.86 | 60.40 | 1.029 | 6.9 | 0.27 |
| 0176-090-4 | 1.04 | | | | | |
| 0176-090-7 | 1.07 | 18.35 | 59.50 | 1.068 | 7.21 | 0.31 |
| 0176-090-10 | 1.10 | | | | | |
| 0176-090-13 | 1.13 | 12.06 | 58.30 | 1.126 | 7.52 | 0.3 |
| 0176-090-18 | 1.18 | | | | | |
| 0176-090-23 | 1.23 | 7.66 | 56.30 | 1.221 | 7.8 | 0.29 |

The preparation of SKMP with a high potassium to sodium ratio with a slow rate of cooling, i.e., the slow chill condition, was used to generate higher levels of insolubles. For a "slow chill" example, the entire 50 grams of melt was cooled on a single chill plate and as a result the cooling rate was significantly slower than that of the polyphosphates of Tables 2 to 5. The sodium and potassium phosphates in the quantities and proportions for samples comprising 76 mole % M-as-K, as indicated in Table 1, were mixed together in an uncovered inert metal dish and heated to 900° C. for 10-20 minutes in a muffle furnace. The results of the analysis for "slow chill" polyphosphates are set forth in Tables 6 and 7, below.

TABLE 6

76 mole % M-as-K SLOW CHILL
76 mole % M-as-K SLOW CHILL

| | Sample | | | | | | | |
|---|---|---|---|---|---|---|---|---|
| | 0359-024-02 | 0176-091-3 | 0176-091-4 | 0176-091-7 | 0176-091-10 | 0176-091-13 | 0176-091-18 | 0176-091-23 |
| Target M/P | 1.00 | 1.03 | 1.04 | 1.07 | 1.10 | 1.13 | 1.18 | 1.23 |
| wt % insolubles | 18.37 | 12.04 | 12.70 | 8.06 | 8.53 | 1.77 | 1.19 | 0.99 |

TABLE 7

76 mole % M-as-K SLOW CHILL

| Sample | Target M/P | Ave. Chain Length | wt % $P_2O_5$ | Measured M/P | pH | wt % $H_2O$ |
|---|---|---|---|---|---|---|
| 0359-024-02 | 1.00 | | | | | |
| 0176-091-3 | 1.03 | 21.63 | 61.20 | 1.030 | 6.5 | 0.48 |
| 0176-091-4 | 1.04 | | | | | |
| 0176-091-7 | 1.07 | 17.31 | 60.40 | 1.068 | 7.13 | 0.37 |
| 0176-091-10 | 1.10 | | | | | |
| 0176-091-13 | 1.13 | 11.13 | 59.10 | 1.126 | 7.37 | 0.4 |

TABLE 7-continued

76 mole % M-as-K SLOW CHILL

| Sample | Target M/P | Ave. Chain Length | wt % $P_2O_5$ | Measured M/P | pH | wt % $H_2O$ |
|---|---|---|---|---|---|---|
| 0176-091-18 | 1.18 | | | | | |
| 0176-091-23 | 1.23 | 8.0 | 57.20 | 1.224 | 8.2 | 0.2 |

Figure 2A:
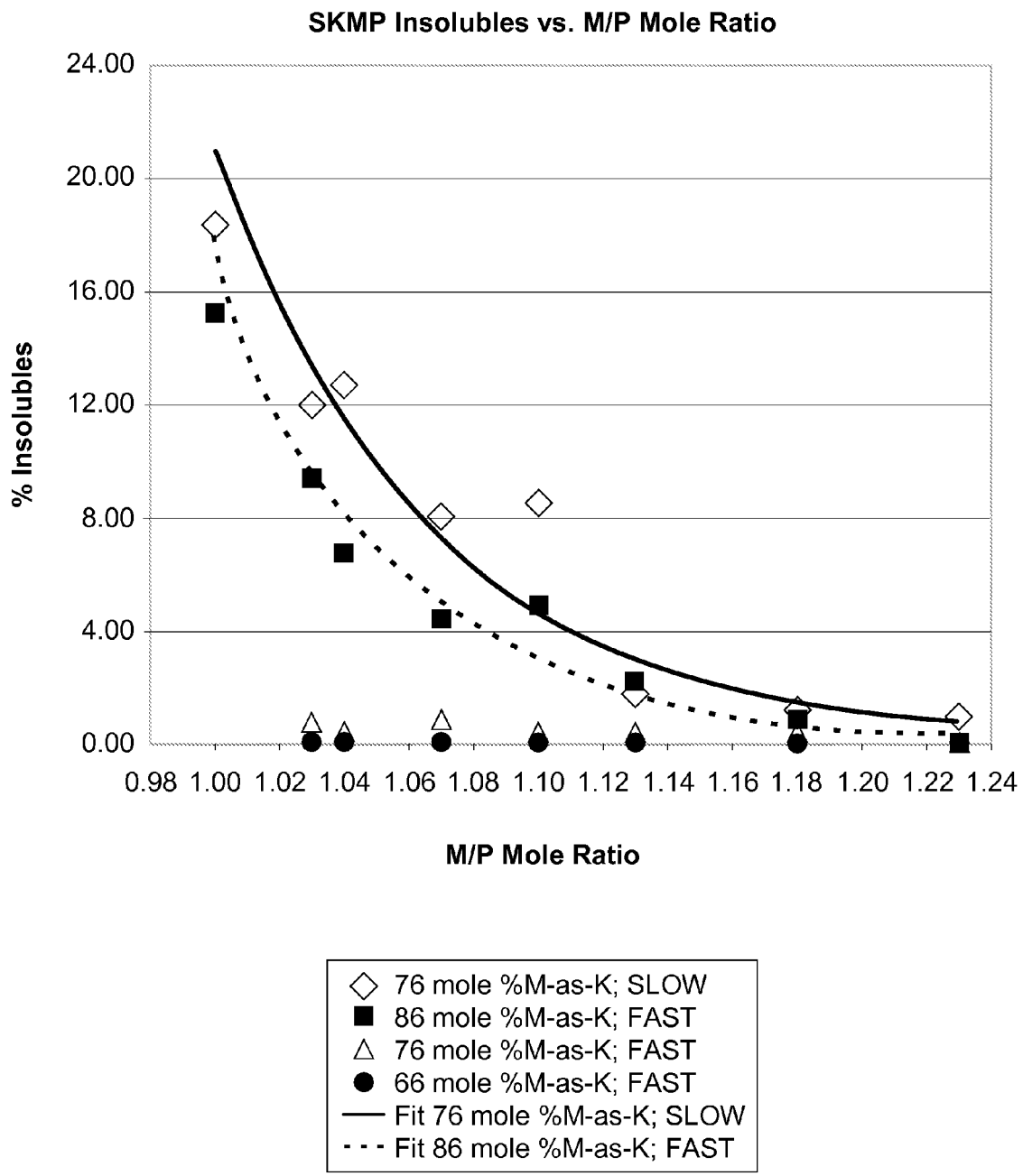
FIGS. 2A-2B illustrate the percent of insolubles in SKMP glass over a range of 1.03 to 1.23 M/P mole ratio. Insoluble content as a percentage of the SKMP glass decreases with increasing M/P mole ratio. The decrease in insoluble content as a function of the M/P mole ratio is particularly dramatic for SKMP with 86 mole % M-as-K or higher prepared by rapid cooling of the melt. Fast cooling of a melt for SKMP with 76 mole % M-as-K results in less than about 1% insoluble content for the range in M/P mole ratio from 1.03 to 1.23. Fast cooling of a melt for SKMP with 66 mole % M-as-K results in less than about 0.1% insoluble content for the range in M/P mole ratio from 1.03 to 1.23. The decrease in insoluble content as a function of the M/P mole ratio is also particularly dramatic for SKMP with 76 mole % M-as-K prepared by slow cooling of a melt.
Figure 2B:
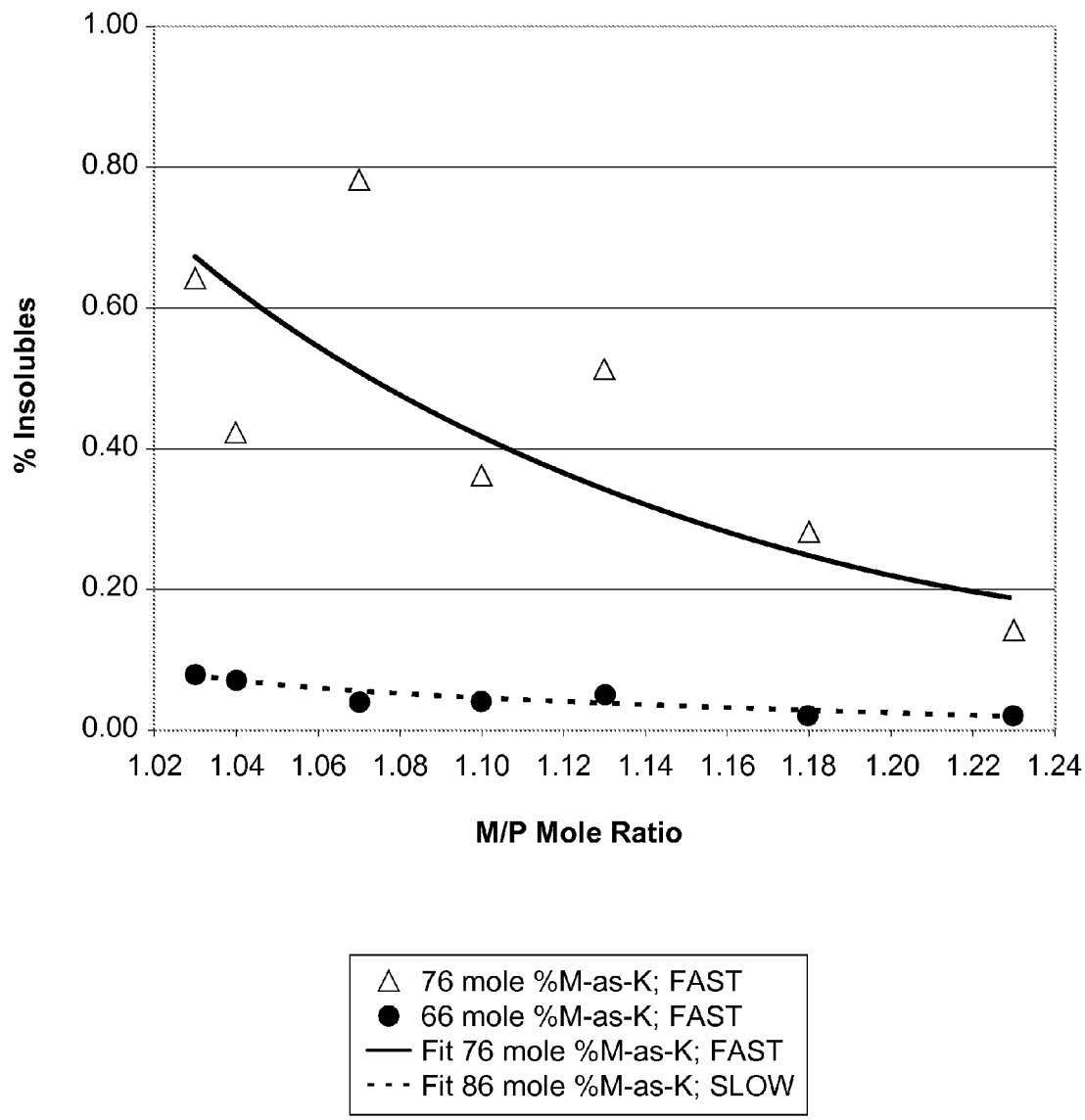

FIGS. 2A and 2B are graphs of percent by weight insoluble content present in SKMP glass over a range of 1.03 to 1.23 M/P mole ratio, summarizing the data in Tables 2 and 6. Insoluble content as a percentage of the SKMP glass decreased with increasing M/P mole ratio. The decrease in insoluble content was particularly dramatic for SKMP with 86 mole % M-as-K or higher prepared by rapid cooling of the melt. Fast cooling of a melt for SKMP with 76 mole % M-as-K resulted in less than about 1% insoluble content for the range in M/P mole ratio from 1.03 to 1.23. Fast cooling of a melt for SKMP with 66 mole % M-as-K resulted in less than about 0.1% insoluble content for the range in M/P mole ratio from 1.03 to 1.23. The decrease in insoluble content was also particularly dramatic for SKMP with 76 mole % M-as-K prepared by slow cooling of a melt.

Example 2

Preparations were made of samples with 1.07 M/P mole ratio, 76 mole % M-as-K, and slow cooling, and were used to assess the impact of additives on insolubles formation. The additives chosen included sodium tetraborate and Kasil 6. The latter contains silica and was tested to determine whether silica-containing materials would be appropriate glass-forming additives. The amounts of the additives are listed in Table 8. As provided in Table 1, the ingredients for 1.07 M/P mole ratio, 76 mole % M-as-K SKMP are 39.07 g of monopotassium phosphate anhydrous (MKPA), 5.20 g dipotassium phosphate anhydrous (DKPA), and 15.11 g of monosodium phosphate monohydrate, which is equivalent to 13.14 g of monosodium phosphate anhydrous (MSPA). The ingredients, including any additives, were mixed and heated to 900° C. for 10-20 min. The entire melt was poured onto a single copper chill plate and allowed to cool, i.e., slow chill. The total final weight of melt (anhydrous weight, before additives) was 50 g.

TABLE 8

| | SAMPLE | | | | |
|---|---|---|---|---|---|
| | 0176-091-7 | 0176-098-B1 | 0176-098-B2 | 0176-098-S1 | 0176-098-S2 |
| Additive | None | $Na_2B_4O_7 \cdot 10H_2O$ | | Kasil 6*** | |
| wt (g) Additive | None | 1.00 | 0.30 | 1.32 | 2.91 (45.4%) |
| wt (g) AO** | — | 0.528 | 0.158 | 0.517 | 0.517 |

TABLE 8-continued

| | SAMPLE | | | | |
|---|---|---|---|---|---|
| | 0176-091-7 | 0176-098-B1 | 0176-098-B2 | 0176-098-S1 | 0176-098-S2 |
| wt (g) BO** | — | 0.365 | 0.110 | 0.350 | 0.350 |
| wt % Additive* | None | 1.04 | 0.31 | 1.02 | 1.02 |
| wt % AO** | — | 1.04 | 0.31 | 1.02 | 1.02 |
| wt % BO** | — | 0.72 | 0.22 | 0.69 | 0.69 |

*anhydrous salt in final melt
**AO = Anhydrous Oxides; BO = Basic Oxide, e.g. $B_2O_3$, $SiO_2$
***12.65% $K_2O$, 26.5% $SiO_2$ All melts were homogeneous except for 0176-098-S1. For sample 0176-098-S1, about six pieces of Kasil 6 (1.32 g) were placed on top of the orthophosphate salt mix. As the mixture was melted, the Kasil 6 remained somewhat segregated, even after mixing the melt at 900° C. Whereas all other samples of Example 2 were prepared directly as a melt of solids, sample 0176-098-S2 was prepared as a liquor prior to melting. In sample 0176-098-S2, the orthophosphate salts were dissolved in water at boiling temperature to make a concentrated phosphate liquor and a Kasil 6 solution (2.91 g of a 45.4% solution) was mixed with the liquor. As the liquor was heated, the solution was homogeneous and clear at ~325-350° C. and at 900° C. (like the other liquors, above). When chilled however, the 098-S2 melt became extremely cloudy throughout, unlike the other chilled melts. Chilled 098-S1, 098-B2, and 091-7 had some opaque regions but generally were clear. Chilled 098-B1 was clear throughout. The products were analyzed using method described above and the results are set forth in Table 9, below.

TABLE 9

76 mole % M-as-K; 1.07 M/P mole ratio SLOW CHILL

| | SAMPLE | | | | |
|---|---|---|---|---|---|
| | 091-7 | 098-B1 | 098-B2 | 098-S1 | 098-S2 |
| Additive | None | $Na_2B_4O_7 \cdot 10H_2O$ | | Kasil 6 | |
| wt % $B_2O_3$ from additive | None | 0.72 | 0.22 | 1.02 | 1.02 |
| wt % Insolubles | 8.06 | 0.26 | 1.53 | 5.6 | 10.45 |

The data in Table 9 show the effect of sodium tetraborate on reducing insolubles and the absence of any insoluble-reducing effect from added silicate (Kasil 6). Sodium tetraborate at 1.04 wt % (equivalent to 0.72 wt % $B_2O_3$) by weight resulted in about a 30-fold reduction in the formation of water-insolubles. Even at 0.31 wt % sodium tetraborate (0.22 wt % $B_2O_3$), insolubles formation was still significantly reduced, about a 5-fold, compared with no additive. Under the conditions tested, Kasil 6 had a much less significant impact on insolubles formation, if any at all.

Example 3

To evaluate the impact of various boron-containing glass-formers on insolubles formation in SKMP, preparations were made of the samples with 1.07 M/P mole ratio, 76% M-as-K, and slow cooling, and were used to assess the impact of additives on insolubles formation. The additives chosen included $K_2B_4O_7$, $B_2O_3$, $Na_2B_4O_7$, $H_3B_2O_3$, $KB_5O_8$, and $NaBO_2$ were added in amounts that correspond to the amounts of $B_2O_3$ added to the melt/glass listed in Table 10. The ingredients, including any additives, were mixed and heated to about 900° C. and maintained at about that temperature for a duration n between about 10 and about 20 minutes. The analysis results are in Table 10.

TABLE 10

76 mole % M-as-K SLOW CHILL

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0176-091-7 | 1.07 | none | — | 8.06 | 17.31 | 60.4 | 1.068 | 7.13 | 0.37 |
| 0359-016-01 | 1.07 | $K_2B_4O_7 \cdot 4H_2O$ | 0.60 | 0.296 | | | | | |
| 0359-016-02 | 1.07 | $B_2O_3$ | 1.00 | 0.143 | 8.14 | 59.78 | 1.067 | 6.4 | 1.35 |
| 0359-016-03 | 1.07 | $Na_2B_4O_7 \cdot 10H_2O$ | 0.69 | 0.134 | 8.74 | 59.64 | 1.08 | 6.72 | 1.13 |
| 0359-016-04 | 1.07 | $H_3BO_3$ | 0.56 | 0.192 | | | | | |
| 0359-016-05 | 1.07 | $KB_5O_8 \cdot 4H_2O$ | 0.79 | 0.851 | | | | | |
| 0359-016-06 | 1.07 | $NaBO_2 \cdot 4H_2O$ | 0.53 | 0.682 | | | | | |

Several significant results are apparent from Table 10. The addition of the boron-containing additives to 76 mole % M-as-K SKMP resulted in a reduction of insolubles that ranged from about a 10-fold reduction to about a 60-fold reduction. Further, the results show that $Na_2B_4O_7$, $B_2O_3$, $H_3B_2O_3$, and $K_2B_4O_7$ provided a greater reduction in insolubles than $NaBO_2$ or $KB_5O_8$. The samples made with the $Na_2B_4O_7$ and $B_2O_3$ additives were further characterized to determine properties of the SKMP glass. The average chain length of the produced polyphosphates, the M/P mole ratio, and the percent by weight $P_2O_5$ content were determined by titration. With the 1% addition of boron-containing glass-former, reduced the average chain length of phosphates of SKMP by about half. This reduction in chain length is consistent with the higher percent by weight $H_2O$ content.

Borate-phosphate linkages hydrolyze upon dissolution, generating more acid groups that are detected in the titration and reported as percent by weight of $H_2O$.

Example 4

Preparations were made of SKMP samples with 0.924-1.07 M/P mole ratio, 76 mole % M-as-K, and slow cooling, and were used to assess the impact of the addition of 1.00% by weight sodium tetraborate (anhydrous basis) on insolubles formation over several M/P mole ratios. The ingredients, including any additives, were mixed and heated to 900° C. for 10-20 min. The results of the analysis of the SKMP samples are shown in Table 11.

was close to that anticipated from the starting materials (i.e., there is not significant volatilization of $P_2O_5$). Further, the addition of boron-containing glass-former resulted in a significant reduction of the average chain length of polyphosphates.

Example 5

To determine if the addition of boron-containing glass-former additives was compatible with a fast chill rate, experiments were performed using samples prepared at 76 mole % M-as-K. Preparations were made of SKMP samples with 1.00

TABLE 11

76 mole % M-as-K SLOW CHILL

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0359-025-02 | 0.924 | none | — | 0.451 | 36.75 | 63.52 | 0.919 | — | 0.437 |
| 0359-025-01 | 0.924 | $Na_2B_4O_7 \cdot 10H_2O$ | 0.69 | 0.213 | 17.38 | 63.30 | 0.932 | — | 0.915 |
| 0359-024-02 | 1.00 | none | — | 18.371 | | | | | |
| 0359-024-01 | 1.00 | $Na_2B_4O_7 \cdot 10H_2O$ | 0.69 | 0.374 | 11.63 | 61.07 | 1.013 | 5.57 | 1.23 |
| 0176-091-7 | 1.07 | none | — | 8.06 | 17.31 | 60.4 | 1.068 | 7.13 | 0.37 |
| 0359-016-03 | 1.07 | $Na_2B_4O_7 \cdot 10H_2O$ | 0.69 | 0.134 | 8.74 | 59.64 | 1.08 | 6.72 | 1.13 |

As shown in Table 11, sodium tetraborate at a 1.00% (0.69% $B_2O_3$) level showed a similar reduction in insolubles at a M/P mole ratio of 1.00 as at a M/P mole ratio of 1.07 (about a 50-fold reduction and about a 60-fold reduction, respectively). Even though the percent by weight insolubles was low at a M/P mole ratio of 0.924, the addition of sodium tetraborate still further reduced the insolubles (about a 2-fold reduction). Additionally, the M/P mole ratio of the polyphosphate M/P mole ratio and 76 mole % M-as-K, and were used to assess the impact of sodium tetraborate on insolubles formation. Furthermore, it was of interest to determine whether a combination of a fast-chill and boron-containing additive would have a cumulative effect on in soluble content. So, the polyphosphate melts were chilled at the fast and slow rates. The results of the analysis of the SKMP samples are shown in Table 12.

TABLE 12

76 mole % M-as-K SLOW and FAST CHILL

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0359-024-02[S] | 1.00 | none | — | 18.371 | | | | | |
| 0359-024-01[S] | 1.00 | $Na_2B_4O_7 \cdot 10H_2O$ | 0.69 | 0.374 | 11.63 | 61.07 | 1.013 | 5.57 | 1.23 |
| 0359-031-02[F] | 1.00 | none | — | 0.725 | 51.24 | 61.96 | 1.000 | 4.72 | 0.31 |
| 0359-033-01[F] | 1.00 | $Na_2B_4O_7 \cdot 10H_2O$ | 0.35 | 0.309 | 16.57 | 61.36 | 1.011 | 5.54 | 0.857 |
| 0359-033-02[F] | 1.00 | $Na_2B_4O_7 \cdot 10H_2O$ | 0.55 | 0.231 | 13.4 | 61.16 | 1.015 | 5.62 | 1.044 |
| 0359-031-01[F] | 1.00 | $Na_2B_4O_7 \cdot 10H_2O$ | 0.69 | 0.207 | 14.69 | 61.24 | 1.014 | 5.78 | 0.951 |

[F]Fast chill rate
[S]Slow chill rate

As shown in Table 12, sodium tetraborate was tested using either slow chill or fast chill conditions and varying amounts of sodium tetraborate. Using a fast chill rate had an added effect on decreasing insolubles formation when used with sodium tetraborates.

Example 6

Preparations were made of SKMP samples with 0.924-1.23 M/P mole ratio, 86 mole % M-as-K, and fast cooling, and were used to assess the impact of sodium tetraborate on insolubles formation. The results of the analysis of the SKMP samples are shown in Table 13.

TABLE 13

86 mole % M-as-K FAST CHILL

Figure 3:
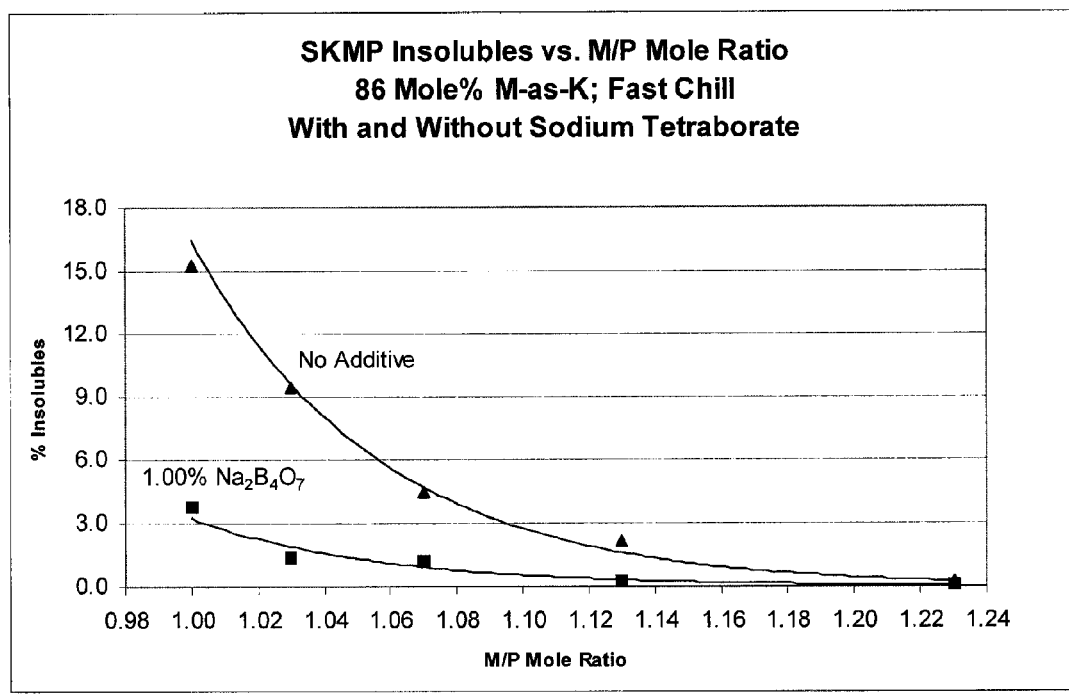
FIG. 3 illustrates the percent of insolubles in SKMP glass with 86 mole % M-as-K made by fast chilling either with or without the addition of 1% by weight sodium tetraborate over a range of M/P mole ratios from 1.00 to 1.23. SKMP glass with 86 mole % M-as-K made by fast chilling has less insolubles content by percent weight when 1% by weight sodium tetraborate (which is equivalent to 0.69% by weight $B_2O_3$) is added for various samples prepared with M/P mole ratios from 1.00 to 1.23.

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0359-026-02 | 0.924 | none | — | 1.165 | 32.72 | 62.72 | 0.927 | — | 0.483 |
| 0359-026-01 | 0.924 | $Na_2B_4O_7 \cdot 10H_2O$ | 0.69 | 1.101 | 18.34 | 62.58 | 0.918 | — | 0.858 |
| 0359-023-02 | 1.00 | none | — | 15.255 | | | | | |
| 0359-023-01 | 1.00 | $Na_2B_4O_7 \cdot 10H_2O$ | 0.69 | 3.814 | | | | | |
| 0176-090-3 | 1.03 | none | — | 9.40 | 30.86 | 60.4 | 1.029 | 6.9 | 0.27 |
| 0359-020-01 | 1.03 | $Na_2B_4O_7 \cdot 10H_2O$ | 0.69 | 1.393 | 10.67 | 59.62 | 1.042 | 6.22 | 1.1 |
| 0176-090-7 | 1.07 | none | — | 4.44 | 18.35 | 59.5 | 1.068 | 7.21 | 0.31 |
| 0359-029-01 | 1.07 | $Na_2B_4O_7 \cdot 10H_2O$ | 0.35 | 4.008 | | | | | |
| 0359-019-02 | 1.07 | $Na_2B_4O_7 \cdot 10H_2O$ | 0.69 | 1.210 | 8.83 | 58.78 | 1.080 | 6.66 | 1.09 |
| 0359-029-02 | 1.07 | $Na_2B_4O_7 \cdot 10H_2O$ | 1.38 | 0.101 | | | | | |
| 0176-090-13 | 1.13 | none | — | 2.18 | 12.06 | 58.3 | 1.126 | 7.52 | 0.30 |
| 0359-020-02 | 1.13 | $Na_2B_4O_7 \cdot 10H_2O$ | 0.69 | 0.266 | 6.03 | 57.38 | 1.136 | 6.68 | 1.42 |
| 0176-090-23 | 1.23 | none | — | 0.23 | | | | | |
| 0359-020-03 | 1.23 | $Na_2B_4O_7 \cdot 10H_2O$ | 0.69 | 0.059 | | | | | | results of the insolubles analyses in Table 13 are graphed in FIG. 3. The addition of sodium tetraborate at a 1.00% (0.69% $B_2O_3$) level showed a reduction in insolubles of about a 4-fold reduction to about an 8-fold reduction for M/P mole ratios between 1.00 and 1.23. For the M/P mole ratio of 1.00, increasing levels of sodium tetraborate resulted in decreasing insolubles content. Again, the addition of boron-containing glass-former resulted in higher percent by weight $H_2O$, lower pH, and shorter average chain length of phosphates.

Example 7

In this example, the effects of various boron-containing glass-former additives, used in combination with fast chilling, on insolubles formation are evaluated. Preparations were made of the samples with 1.07 M/P mole ratio, 86 mole % M-as-K, and fast cooling. The results of the analysis of the SKMP samples are shown in Table 14.

TABLE 14

86 mole % M-as-K FAST CHILL

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0176-090-7 | 1.07 | none | — | 4.44 | 18.35 | 59.5 | 1.068 | 7.21 | 0.31 |
| 0359-019-01 | 1.07 | $H_3BO_3$ | 0.56 | 1.052 | | | | | |
| 0359-019-03 019-02 | 1.07 | $Na_2B_4O_7 \cdot 10H_2O$ | 0.69 | 1.210 | 8.83 | 58.78 | 1.080 | 6.66 | 1.09 |
| 0359- | 1.07 | $K_2B_4O_7 \cdot 4H_2O$ | 0.60 | 2.166 | | | | | |

Addition of boron-containing glass-former at a higher mole % M-as-K and faster chill rate also resulted in a reduction of insolubles (Table 14), but by a smaller factor compared with results in Table 10 (~2-fold to 4-fold vs. ~40-fold to 60-fold). The addition of boron-containing glass-former again resulted in higher percent by weight $H_2O$, lower pH, and shorter average chain length of phosphates. Reduction in the M/P mole ratio from 1.07 to 1.03 recovered some of the average chain length of phosphates when 1% sodium tetraborate (0.695 $B_2O_3$) was present; the average chain length of phosphates increased from about 8.8 to about 10.7, respectively. Without the boron-containing additive present, the average chain length of polyphosphates was 18.4.

Example 8

The effect of boron-containing glass-former additives on insolubles formation was examined for SKMP at 92 mole % M-as-K using a fast chill rate to determine whether a fast chill rate and the addition of boron-containing glass-former was able to reduce insolubles at this high mole % M-as-K. Preparations were made of SKMP samples with 1.03-1.13 M/P mole ratio, 92 mole % M-as-K. The results are set forth in Table 15.

TABLE 15

92 mole % M-as-K FAST CHILL

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0359-021-02 | 1.03 | none | — | 31.38 | | | | | |
| 0359-021-01 | 1.03 | $Na_2B_4O_7 \cdot 10H_2O$ | 0.69 | 2.141 | 10.27 | 59.13 | 1.040 | 6.25 | 1.16 |
| 0359-021-04 | 1.07 | none | — | 9.368 | | | | | |
| 0359-021-03 | 1.07 | $Na_2B_4O_7 \cdot 10H_2O$ | 0.69 | 2.238 | | | | | |
| 0359-021-06 | 1.13 | none | — | 3.108 | | | | | |
| 0359-021-05 | 1.13 | $Na_2B_4O_7 \cdot 10H_2O$ | 0.69 | 0.522 | | | | | |

Figure 4:
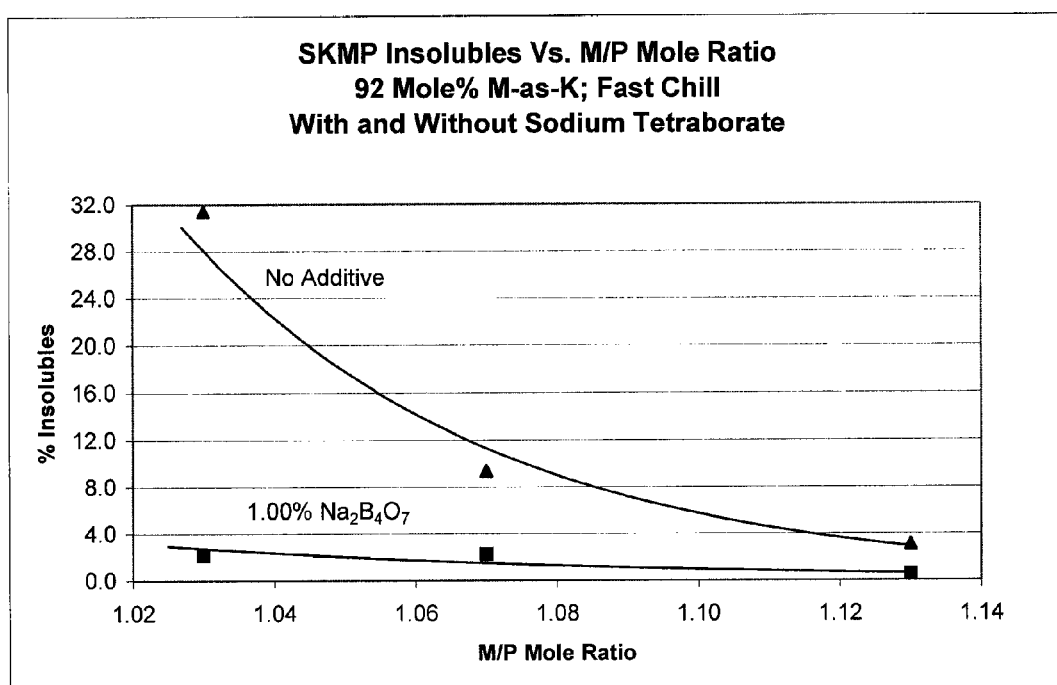
FIG. 4 illustrates the percent of insolubles in SKMP glass with 92 mole % M-as-K made by fast chilling either with or without the addition of 1% by weight sodium tetraborate over a range of M/P mole ratios from 1.03 to 1.13. SKMP glass with 86 mole % M-as-K made by fast chilling has less insolubles content by percent weight when 1% by weight sodium tetraborate (which is equivalent to 0.69% by weight $B_2O_3$) is added for various samples prepared with M/P mole ratios from 1.03 to 1.13.

As shown in Table 15, addition of boron-containing glass-former still showed an effect on insolubles formation, even at very high potassium content and fast chill rate—the reduction ranged from about 4× to about 15×. The results of the insolubles analyses in Table 15 are depicted in FIG. 4.

Example 9

The effect of boron-containing glass-former additives on insolubles formation was examined for potassium metaphosphate, KMP in which the mole % M-as-K is 100%. Preparations were made of KMP samples with 1.00 or 1.07 M/P mole ratio and were used to assess the impact of additives on insolubles formation. The results of the analysis of the SKMP samples are shown in Table 16.

TABLE 16

100 mole % M-as-K SLOW and FAST CHILL

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0359-028-02$^F$ | 1.00 | none | — | 96.74 | | | | | |
| 0359-028-01$^F$ | 1.00 | $Na_2B_4O_7 \cdot 10H_2O$ | 0.69 | 88.41 | | | | | |
| 0359-014-01$^S$ | 1.07 | none | — | 83.36 | | | | | |
| 0359-017-01$^S$ | 1.07 | $H_3BO_3$ | 0.28 | 78.55 | | | | | |
| 0359-017-02$^S$ | 1.07 | $H_3BO_3$ | 0.56 | 65.46 | | | | | |
| 0359-015-02$^F$ | 1.07 | none | — | 60.04 | | | | | |
| 0359-018-01$^F$ | 1.07 | $H_3BO_3$ | 0.56 | 3.36 | 8.31 | 57.82 | 1.066 | 6.55 | 1.279 |

$^F$Fast chill rate
$^S$Slow chill rate

The percent by weight insolubles in the resulting KMP was significantly reduced by the addition of borates. Especially notable was the effect of boric acid on the fast cooled, off-ratio KMP with an M/P mole ratio of 1.07; insolubles were reduced about 20-fold from about 60% to about 3%.

Example 10

Polyphosphate glass compositions may be prepared directly as a melt of solids or of a liquor. To determine if the addition of boron-containing glass-former additives was compatible with preparing SKMP glass from a liquor, experiments were performed using samples prepared with 0.995 M/P mole ratio, 70 mole % M-as-K, and fast cooling. The ingredients MSPA (63.37 g), MKPA (167.72 g), and phosphoric acid (1.03 g of an 85% w/w $H_3PO_4$ solution) were dissolved in deionized water and heated to 105° C. The total weight of the resulting liquor was 412.85 g. The target M/P mole ratio was 0.995, the mole % M-as-K was 70, and the percentage by weight of dissolved solids was 56.14% of the total weight of the liquor. An identical liquor was prepared except sodium tetraborate decahydrate (1.90 g) was also added (total weight of liquor=414.75 g). Portions of the two liquors (with and without added sodium tetraborate decahydrate) were melted at 900° C. and held for 10-20 min. Both preparations produced 50 g of melt from 103.29 g of liquor. The melts were subject to a fast chill and the products were analyzed, with the results provided in Table 17.

TABLE 17

70 mole % M-as-K FAST CHILL

| Sample | Target M/P | Additive | wt % $B_2O_3$ from additive | wt % insolubles | Ave. Chain Length | wt % $P_2O_5$ | Measured M/P | pH | wt % $H_2O$ |
|---|---|---|---|---|---|---|---|---|---|
| 0360-023-01 | 0.995 | none | — | 0.440 | 37.19 | 62.49 | 0.997 | 4.35 | 0.453 |
| 0360-023-02 | 0.995 | $Na_2B_4O_7 \cdot 10H_2O$ | 0.35 | 0.096 | 21.97 | 62.21 | 1.003 | 5.38 | 0.696 |

The addition of 1.00% by weight sodium tetraborate (0.35% $B_2O_3$) showed a reduction in insolubles at a M/P mole ratio of 0.995. Even though the percent by weight insolubles was low at a M/P mole ratio of 0.995, the addition of sodium tetraborate still further reduced the insolubles (about a 4-fold reduction).

Example 11

Because it was observed that the average chain length of phosphates is reduced when adding boron-containing glass-former, significantly varying M/P mole ratios were tested for the ability to keep the average chain length of phosphates from shortening. Preparations were made of SKMP samples with 0.95-1.07 M/P mole ratio, 76% M-as-K, and fast cooling, and were used to assess the impact of varying amounts of sodium tetraborate on insolubles formation and average chain length of phosphates. The ingredients, including any additives, were mixed and heated to 900° C., for 10-20 min. The melt was rapidly cooled between two large copper chill plates, half of the melt at a time, i.e., fast chill. The total final weight of melt (anhydrous weight, before additives) was 50 g. The results of the analysis of the SKMP samples are shown in Table 18.

TABLE 18

76 mole % M-as-K FAST CHILL

| Sample | Target M/P | Additive | wt % B$_2$O$_3$ from additive | wt % insolubles | Ave. Chain Length | wt % P$_2$O$_5$ | Measured M/P | pH | wt % H$_2$O |
|---|---|---|---|---|---|---|---|---|---|
| 0359-032-01 | 0.95 | Na$_2$B$_4$O$_7$•10H$_2$O | 0.35 | 0.112 | 24.6 | 62.55 | 0.958 | 3.03 | 0.976 |
| 0359-032-02 | 0.95 | Na$_2$B$_4$O$_7$•10H$_2$O | 0.55 | 0.098 | 21.9 | 62.43 | 0.962 | 3.1 | 1.024 |
| 0359-036-01 | 0.98 | Na$_2$B$_4$O$_7$•10H$_2$O | 0.35 | 0.335 | 17.92 | 61.83 | 0.989 | 3.66 | 0.961 |
| 0359-036-02 | 0.99 | Na$_2$B$_4$O$_7$•10H$_2$O | 0.35 | 0.183 | 23.51 | 61.8 | 0.998 | 4.49 | 0.686 |
| 0359-031-02 | 1.00 | none | — | 0.725 | 51.24 | 61.96 | 1.000 | 4.72 | 0.31 |
| 0359-033-01 | 1.00 | Na$_2$B$_4$O$_7$•10H$_2$O | 0.35 | 0.309 | 16.57 | 61.36 | 1.011 | 5.54 | 0.857 |
| 0359-033-02 | 1.00 | Na$_2$B$_4$O$_7$•10H$_2$O | 0.55 | 0.231 | 13.4 | 61.16 | 1.015 | 5.62 | 1.044 |
| 0359-031-01 | 1.00 | Na$_2$B$_4$O$_7$•10H$_2$O | 0.69 | 0.207 | 14.69 | 61.24 | 1.014 | 5.78 | 0.951 |
| 0359-035-02 | 1.02 | Na$_2$B$_4$O$_7$•10H$_2$O | 0.35 | 0.487 | 13.48 | 60.94 | 1.027 | 6.11 | 0.939 |
| 0359-034-01 | 1.05 | Na$_2$B$_4$O$_7$*10H$_2$O | 0.35 | 0.286 | 12.91 | 60.43 | 1.054 | 6.65 | 0.773 |
| 0359-034-02 | 1.05 | Na$_2$B$_4$O$_7$•10H$_2$O | 0.55 | 0.088 | 11.17 | 60.23 | 1.059 | 6.58 | 0.914 |
| 0359-035-01 | 1.07 | none | — | 1.299 | 18.16 | 60.35 | 1.071 | 7.18 | 0.303 |

Figure 5:
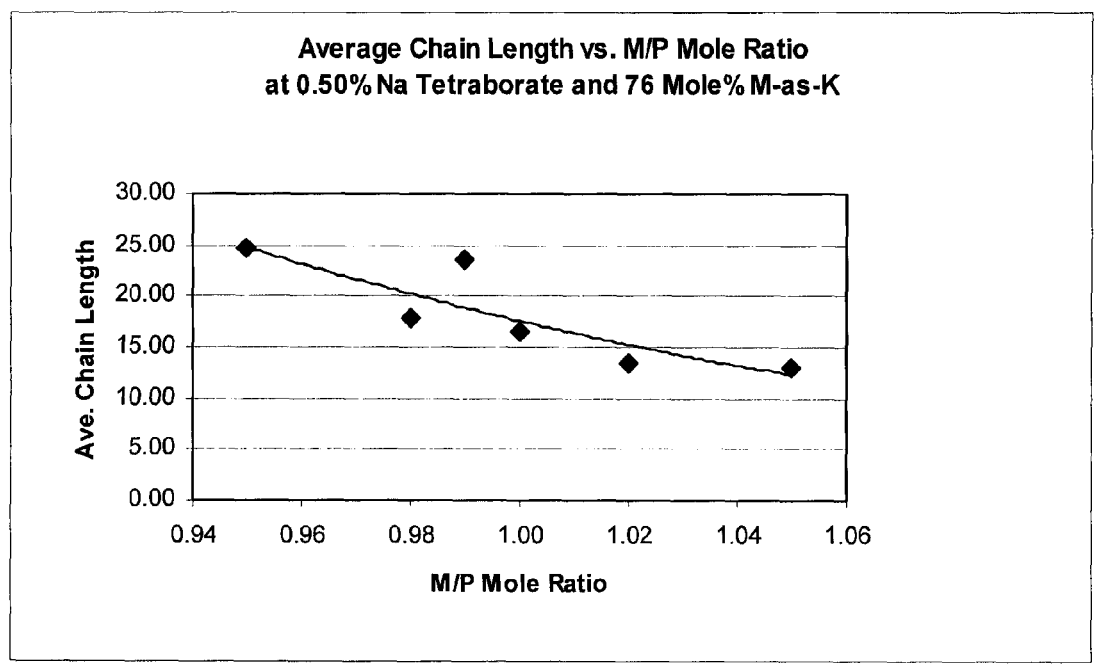
FIG. 5 illustrates the effect of the addition of 0.5% by weight sodium tetraborate has on the average chain length of phosphates in SKMP glass with 76 mole % M-as-K made by fast chilling over a range of M/P mole ratios from 0.95 to 1.05.

As shown in Table 18 and depicted in FIG. 5, at an M/P mole ratio of 1.07, the average chain length of phosphates without boron-containing glass-former additive was about 18 and this average chain length could be achieved in a borate-containing polyphosphate by adjusting the M/P ratio downward.

As various modifications could be made in the constructions and methods herein described and illustrated without departing from the scope of the invention, it is intended that all matter contained in the foregoing description shall be interpreted as illustrative rather than limiting. For example, the invention may be used in other potassium-containing glass systems in which crystallization or formation of insolubles is not desired, including glass systems based on potassium zinc phosphates, potassium iron phosphates, potassium sodium calcium phosphates, etc. Thus, the breadth and scope of the present invention should not be limited by any of the above-described exemplary embodiments, but should be defined only in accordance with the following claims appended hereto and their equivalents.

What is claimed is:

1. A borate-modified potassium-containing polyphosphate glass composition, wherein said polyphosphate glass composition is represented as comprising M$_2$O, B$_2$O$_3$, and P$_2$O$_5$, wherein M is at least K, and has a mole % M-as-K that is at least about 50%, a concentration of B$_2$O$_3$ that is at least about 0.07 mole % and no greater than about 3.3 mole %, a M/P mole ratio that is at least about 0.90 and no greater than about 1.60, and wherein no more than about 10% by weight of said polyphosphate glass composition is insoluble in room temperature water.

2. The borate-modified potassium-containing polyphosphate glass composition of claim 1 wherein the concentration of B$_2$O$_3$ is at least about 0.30 mole % and no greater than about 3.3 mole %.

3. The borate-modified potassium-containing polyphosphate glass composition of claim 1 wherein the M/P mole ratio is at least about 0.95 and no greater than about 1.20.

4. The borate-modified potassium-containing polyphosphate glass composition of claim 1 wherein M is at least K and Na and the mole % M-as-K is at least about 50% and no greater than about 95%.

5. The borate-modified potassium-containing polyphosphate glass composition of claim 1 wherein no more than about 5% by weight of said polyphosphate glass composition is insoluble in room temperature water.

6. The borate-modified potassium-containing polyphosphate glass composition of claim 1 wherein M is K and Na.

7. The borate-modified potassium-containing polyphosphate glass composition of claim 1 wherein M is K.

8. A sodium-potassium polyphosphate (SKMP) composition, wherein the SKMP composition is represented as comprising M$_2$O, B$_2$O$_3$, and P$_2$O$_5$, wherein M is at least K and Na, and wherein the SKMP composition has:
   a) a concentration of B$_2$O$_3$ that is at least about 0.07 mole % and no greater than about 3.3 mole %,
   b) a M/P mole ratio that is at least about 0.90 and no greater than about 1.60;
   c) a mole % M-as-K that is at least about 50%; and
   d) a concentration of water insolubles that is less than about 10% by weight in room temperature water.

9. The SKMP composition of claim 8 wherein:
   a) the concentration of B$_2$O$_3$ is at least about 0.30 mole % and no greater than about 3.3 mole %, and
   b) the mole % M-as-K is at least about 50% and no greater than about 95%.

10. A food composition comprising a sodium-potassium polyphosphate (SKMP) composition, wherein the SKMP composition is represented as comprising M$_2$O, B$_2$O$_3$, and P$_2$O$_5$, wherein M is at least K and Na, and wherein the SKMP composition has:
   a) a concentration of B$_2$O$_3$ that is at least about 0.07 mole % and no greater than about 3.3 mole %,
   b) a M/P mole ratio that is at least about 0.90 and no greater than about 1.60;

c) a mole % M-as-K that is at least about 50%; and
d) a concentration of water insolubles that is less than about 10% by weight.

11. The food composition of claim 10 wherein the food is processed cheese.

12. The food composition of claim 10 wherein the food is a meat.

13. The food composition of claim 10 wherein the food is a beverage.

14. A cleaning composition comprising water and a sodium-potassium polyphosphate (SKMP) composition, wherein the SKMP composition is represented as comprising $M_2O$, $B_2O_3$, and $P_2O_5$, wherein M is at least K and Na, and wherein the SKMP composition has:
   a) a concentration of $B_2O_3$ that is at least about 0.07 mole % and no greater than about 3.3 mole %,
   b) a M/P mole ratio that is at least about 0.90 and no greater than about 1.60;
   c) a mole % M-as-K that is at least about 50%; and
   d) a concentration of water insolubles that is less than about 10% by weight in room temperature water.

15. A borate-modified potassium-containing polyphosphate glass composition, wherein said polyphosphate glass composition is represented as consisting essentially of $M_2O$, $B_2O_3$, and $P_2O_5$, wherein M is at least K, and has a mole % M-as-K that is at least about 33%, a concentration of $B_2O_3$ that is at least about 0.07 mole % and no greater than about 8.00 mole %, a M/P mole ratio that is at least about 0.90 and no greater than about 1.60, and wherein no more than about 10% by weight of said polyphosphate glass composition is insoluble in room temperature water.

16. The borate-modified potassium-containing polyphosphate glass composition of claim 15 wherein the concentration of $B_2O_3$ is at least about 0.30 mole % and no greater than about 3.3 mole %.

17. The borate-modified potassium-containing polyphosphate glass composition of claim 15 wherein the M/P mole ratio is at least about 0.95 and no greater than about 1.20.

18. The borate-modified potassium-containing polyphosphate glass composition of claim 15 wherein M is at least K and Na and the mole % M-as-K is at least about 50% and no greater than about 95%.

19. The borate-modified potassium-containing polyphosphate glass composition of claim 15 wherein no more than about 5% by weight of said polyphosphate glass composition is insoluble in room temperature water.

20. The borate-modified potassium-containing polyphosphate glass composition of claim 15 wherein M is K and Na.

21. The borate-modified potassium-containing polyphosphate glass composition of claim 15 wherein M is K.

22. A sodium-potassium polyphosphate (SKMP) composition, wherein the SKMP composition is represented as consisting essentially of $M_2O$, $B_2O_3$, and $P_2O_5$, wherein M is at least K and Na, and wherein the SKMP composition has:
   a) a concentration of $B_2O_3$ that is at least about 0.07 mole % and no greater than about 8.00 mole %,
   b) a M/P mole ratio that is at least about 0.90 and no greater than about 1.60;
   c) a mole % M-as-K that is at least about 33%; and
   d) a concentration of water insolubles that is less than about 10% by weight.

23. The SKMP composition of claim 22 wherein:
   a) the concentration of $B_2O_3$ is at least about 0.30 mole % and no greater than about 3.3 mole %; and
   c) the mole % M-as-K is at least about 50% and no greater than about 95%.

24. The food composition comprising a sodium-potassium polyphosphate (SKMP) composition of claim 10 wherein the SKMP composition has a concentration of $B_2O_3$ that is at least about 0.30 mole % and no greater than about 3.3 mole %.

25. The food composition comprising a sodium-potassium polyphosphate (SKMP) composition of claim 10 wherein the SKMP composition has a mole % M-as-K that is at least about 50% and no greater than about 95%.

26. The cleaning composition comprising water and a sodium-potassium polyphosphate (SKMP) composition of claim 14 wherein the SKMP composition has a mole % M-as-K that is at least about 50% and no greater than about 95%.

27. A food composition comprising a sodium-potassium polyphosphate (SKMP) composition, wherein the SKMP composition is represented as consisting essentially of $M_2O$, $B_2O_3$, and $P_2O_5$, wherein M is at least K and Na, and wherein the SKMP composition has:
   a) a concentration of $B_2O_3$ that is at least about 0.07 mole % and no greater than about 3.3 mole %,
   b) a M/P mole ratio that is at least about 0.90 and no greater than about 1.60;
   c) a mole % M-as-K that is at least about 33%; and
   d) a concentration of water insolubles that is less than about 10% by weight.

28. The food composition of claim 27 wherein the food is processed cheese.

29. The food composition of claim 27 wherein the food is a meat.

30. The food composition of claim 27 wherein the food is a beverage.

31. The food composition comprising a sodium-potassium polyphosphate (SKMP) composition of claim 27 wherein the SKMP composition has a concentration of $B_2O_3$ that is at least about 0.30 mole % and no greater than about 3.3 mole %.

32. The food composition comprising a sodium-potassium polyphosphate (SKMP) composition of claim 27 wherein the SKMP composition has a mole % M-as-K that is at least about 50% and no greater than about 95%.

33. A cleaning composition comprising water and a sodium-potassium polyphosphate (SKMP) composition, wherein the SKMP composition is represented as consisting essentially of $M_2O$, $B_2O_3$, and $P_2O_5$, wherein M is at least K and Na, and wherein the SKMP composition has:
   a) a concentration of $B_2O_3$ that is at least about 0.07 mole % and no greater than about 8.00 mole %,
   b) a M/P mole ratio that is at least about 0.90 and no greater than about 1.60;
   c) a mole % M-as-K that is at least about 33%; and
   d) a concentration of water insolubles that is less than about 10% by weight.

34. The cleaning composition comprising water and a sodium-potassium polyphosphate (SKMP) composition of claim 33 wherein the SKMP composition has a mole % M-as-K that is at least about 50% and no greater than about 95%.

* * * * *